United States Patent
Fung et al.

(10) Patent No.: US 8,574,698 B2
(45) Date of Patent: Nov. 5, 2013

(54) WATER-BASED HOT-FOAM ADHESIVE PANEL

(75) Inventors: Dein-Run Fung, Taipei (TW);
Sen-Huang Hsu, Taipei (TW);
Hung-Hsun Wu, Taipei (TW);
Huei-Jiun Juang, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 182 days.

(21) Appl. No.: 13/064,398

(22) Filed: Mar. 23, 2011

(65) Prior Publication Data
US 2011/0262737 A1    Oct. 27, 2011

(30) Foreign Application Priority Data
Apr. 22, 2010    (TW) ................................ 99112633 A

(51) Int. Cl.
*B32B 9/00* (2006.01)
*B32B 33/00* (2006.01)

(52) U.S. Cl.
USPC ........ 428/40.1; 428/41.5; 428/41.7; 428/41.8

(58) Field of Classification Search
USPC .............................. 428/40.1, 41.5, 41.7, 41.8
See application file for complete search history.

(56) References Cited

U.S. PATENT DOCUMENTS

| | | | |
|---|---|---|---|
| 2005/0186419 A1* | 8/2005 | Kiuchi et al. | 428/343 |
| 2007/0281152 A1* | 12/2007 | Yamamoto | 428/343 |
| 2008/0019078 A1* | 1/2008 | Arimitsu et al. | 361/321.2 |

\* cited by examiner

*Primary Examiner* — Victor Chang
(74) *Attorney, Agent, or Firm* — Bacon & Thomas, PLLC

(57) ABSTRACT

An environmentally friendly water-based heat-expandable adhesive panel, having high adhesiveness and containing solvent-free resins, comprises a substrate layer functioning as a base layer, a primer layer coated on the substrate layer and a heat-expandable layer coated on the primer layer, which is for use in an electronic or plastic component processing process to adhesively fix electronic or plastic components in place temporarily and separate, upon completion of the processing process and commencement of a component-reactivating process, the components from the water-based heat-expandable adhesive panel by heating the water-based heat-expandable adhesive panel at a fixed temperature for a specific period of time, so as to reduce volatile organic compound (VOC) emissions and effectuate environmental protection.

12 Claims, 1 Drawing Sheet

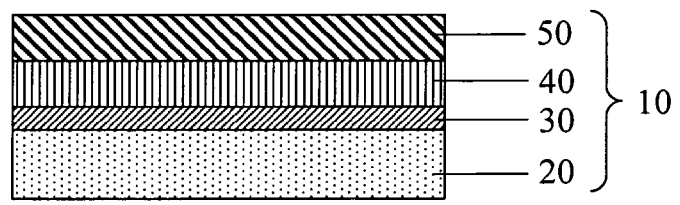

WATER-BASED HOT-FOAM ADHESIVE PANEL

BACKGROUND OF THE INVENTION

1. Field of the Invention

The present invention relates to water-based heat-expandable adhesive panels that contain solvent-free resins, and more particularly, to an environmentally friendly water-based heat-expandable adhesive panel that contains a water-based acrylic emulsion modified by a reactive emulsifier.

2. Description of Prior Art

A commercially available heat-releasable pressure-sensitive adhesive tape comprises a substrate, an organic resilient layer comparable to rubber resin and coated on the substrate, a resin adhesive layer having a blowing agent or a swelling agent and coated on the organic resilient layer, and a detachable release-film protective layer affixed to the surface of the resin adhesive layer.

However, the commercially available heat-releasable pressure-sensitive adhesive tape usually contains solvent-based resin and thus charges a large amount of solvent to the atmosphere during a processing process, thereby causing severe pollution and the greenhouse effect. In recent years, the greenhouse effect is becoming more severe. As a result, the resin synthesis industry is confronted with major issues, that is, reduction of volatile organic compound (VOC) emissions and the ultimate goal of energy saving and carbon reduction. In this regard, water-based resin is a potential Research & Development topic.

Acrylic emulsion plays a crucial role in water-based resin. To ensure the stability of emulsion particles and maintain the stability of acrylic emulsion, it is necessary to add emulsifiers to acrylic emulsion. However, the emulsifiers added to acrylic emulsion are of a low molecular weight and thus tend to permeate; as a result, the finished acrylic emulsion manifests deteriorated adhesiveness.

To overcome the aforesaid drawback of the prior art, the inventor of the present invention studies the adhesiveness of water-based acrylic emulsion resin and has discovered the following: acrylic emulsion remains stable when produced by polymerization of acrylic monomers in the presence of a reactive emulsifier; the reactive emulsifier enhances the adhesiveness and storage stability of water-based acrylic emulsion resin; and the water-based acrylic emulsion thus synthesized reduces VOC emissions and greenhouse effect and thus efficiently mitigates the impact of global warming.

SUMMARY OF THE INVENTION

In view of the aforesaid drawback of the prior art, it is a primary objective of the present invention to provide a water-based acrylic emulsion which is synthesized by bonding a reactive emulsifier and an acrylate polymer together to synthesize an acrylic emulsion by special synthesis technology, and then adding a cross-linking agent, a blowing agent, and an additive to the acrylic emulsion. The water-based acrylic emulsion thus synthesized demonstrates high adhesiveness and storage stability, and can react with a blowing agent of different particle diameters to synthesize a pressure-sensitive adhesive which is expandable when heated.

Accordingly, the water-based acrylic emulsion is fit for use in an electronic or plastic component processing process to adhesively fix electronic or plastic components in place temporarily.

Another primary objective of the present invention is to provide a water-based heat-expandable adhesive panel comprising a substrate layer, a primer layer, and a heat-expandable layer arranged in a stack-up manner, or further comprising a polyester release film layer such that the water-based heat-expandable adhesive panel has a stack-up architecture. The substrate layer functions as a base layer. The primer layer is coated on the substrate layer and has a non-adhesive surface when dried. The heat-expandable layer comprises a blowing agent-containing pressure-sensitive adhesive that is expandable when heated and is coated on the primer layer. Finally, the polyester release film layer which has a release effect is affixed to the heat-expandable layer for protective purpose. Upon removal of the polyester release film layer, the heat-expandable layer of the water-based heat-expandable adhesive panel demonstrates high adhesiveness and thus is fit for use in an electronic or plastic component processing process to adhesively fix electronic or plastic components in place temporarily and separate, upon completion of the processing process, the components from the water-based heat-expandable adhesive panel by heating up the water-based heat-expandable adhesive panel to reach the blowing temperature for a specific period of time, so as to reduce volatile organic compound (VOC) emissions and effectuate environmental protection.

BRIEF DESCRIPTION OF THE DRAWING

FIG. 1 is a schematic view of a water-based heat-expandable adhesive panel with a stack-up architecture according to the present invention.

DETAILED DESCRIPTION OF THE EMBODIMENTS OF THE INVENTION

Referring to FIG. 1, a water-based heat-expandable adhesive panel 10 of the present invention comprises a substrate layer 20, a primer layer 30, and a heat-expandable layer 40 arranged in a stack-up manner, or further comprises a polyester release film layer 50 such that the water-based heat-expandable adhesive panel 10 has a stack-up architecture. The substrate layer 20 functions as a base layer. The primer layer 30 is coated on the substrate layer. The heat-expandable layer 40 is coated on the primer layer 30. The polyester release film layer 50 is affixed to the surface of the heat-expandable layer 40.

The substrate layer 20 can tolerate high heat and thus can survive the processing temperature of the water-based heat-expandable adhesive panel 10 of the present invention. The substrate layer 20 is selectively any plastic film or plate, including a polyester material made from polyethylene (PE), polypropylene (PP), ethylene-propylene copolymer, ethylene vinyl acetate (EVA), polyethylene terephthalate (PET), polybutylene terephthalate (PBT), or polyvinyl chloride (PVC). The polyester materials which the substrate layer 20 is made from can be stretched or subjected to similar treatment, so as to adjust the physical properties, such as extension ratio, of the polyester materials.

The substrate layer 20 may undergo conventional surface treatment for enhancing the adhesive strength of the substrate layer 20 toward the heat-expandable layer 40 or other layers. The surface treatment includes chemical and physical oxidation treatment. For example, the substrate layer 20 may be subjected to chromate treatment, exposed to ozone, exposed to a flame, exposed to ionized radiation, or coated with special primer, fluorine-containing resin, silicone resin, etc.

As regards the water-based heat-expandable adhesive panel 10 of the present invention, the primer layer 30 functions as an intermediate layer between the substrate layer 20 and the heat-expandable layer 40, enhances the adhesiveness between the substrate layer 20 and the heat-expandable layer 40, and mitigates the blowing stress arising from the substrate layer 20 when the blowing agent of the heat-expandable layer 40 is heated up, so as to prevent the separation of the substrate layer 20 and the heat-expandable layer 40 which might otherwise occur as a result of the blowing of the heat-expandable layer 40.

The primer layer 30 is of a thickness between 1 μm and 50 μm, preferably between 5 μm and 40 μm, and most preferably between 8 μm and 20 μm. The primer layer 30 is made of an environmentally friendly water-based acrylic emulsion formed from acrylic monomers and a reactive emulsifier through emulsion polymerization. The primer layer 30, which is hereinafter referred to as the "primer acrylic emulsion" for the sake of brevity, is directly coated on the substrate layer 20 that has already received surface treatment. Eventually, after being dried, the primer layer 30, i.e., the "primer acrylic emulsion", has a non-adhesive surface.

The "primer acrylic emulsion" is synthesized by emulsion polymerization of major constituents as follows:
 a) 75-92 wt % of alkyl group-containing (meth)acrylic ester;
 b) 2-10 wt % of hydroxyl group-containing (meth)acrylic ester;
 c) 1-5 wt % of carboxyl group-containing (meth)acrylic acid; and
 d) 5-10 wt % of an emulsifier having a reactive functional group.

To enhance the adhesiveness between the primer layer 30 and the substrate layer 20, modifying agents, such as a resin, a cross-linking agent, a coupling agent, a thickener, and/or a defoaming agent, are added to the "primer acrylic emulsion" from which the primer layer 30 is made, such that the functionality of the primer layer 30 is put into full play.

The heat-expandable layer 40 is of a thickness between 10 μm and 100 μm, preferably between 20 μm and 80 μm, and most preferably between 30 μm and 70 μm. The heat-expandable layer 40 comprises a blowing agent-containing pressure-sensitive adhesive that is expandable when heated and comprises acrylic emulsion synthesized from acrylic monomers and a reactive emulsifier by emulsion polymerization in the presence of a blowing agent. The heat-expandable layer 40, which is hereinafter referred to as the "heat-expandable pressure-sensitive adhesive" for the sake of brevity, is directly coated on the substrate layer 20 that has already been provided thereon with primer layer 30. Eventually, after being dried, the heat-expandable layer 40 demonstrates high adhesiveness.

The water-based acrylic emulsion for use in making the heat-expandable layer is synthesized by emulsion polymerization of major constituents as follows:
 a) 83-95 wt % of alkyl group-containing (meth)acrylic ester;
 b) 3-6 wt % of hydroxyl group-containing (meth)acrylic ester;
 c) 0.3-4 wt % of carboxyl group-containing (meth)acrylic acid; and
 d) 1-7 wt % of an emulsifier having a reactive functional group.

To enhance the functionality of the heat-expandable layer 40, additives, such as a blowing agent, a thickener, a cross-linking agent, a coupling agent, and/or a dye, are added to the "heat-expandable pressure-sensitive adhesive", that is, the heat-expandable layer 40.

In general, a large amount of an organic solvent is required for the synthesis of the commercially available heat-expandable layer from acrylic adhesive, such as rubber-based adhesive, polyester-based adhesive, or urethane-based adhesive, thereby resulting in an increase of carbon dioxide emissions and the greenhouse effect to the detriment of environmental protection.

Unlike the conventional adhesives for use in synthesis of the typical commercially-available heat-expandable layer, the "heat-expandable pressure-sensitive adhesive" of the present invention does not require the use of an organic solvent and thus is effective in saving energy, reducing carbon dioxide emissions, and protecting the environment.

As regards the water-based heat-expandable adhesive panel 10 of the present invention, the characteristics of the "heat-expandable pressure-sensitive adhesive" of the heat-expandable layer 40 is evaluated with a dynamic mechanical analyzer (DMA). Evaluation of the adhesive elasticity curve of the "heat-expandable pressure-sensitive adhesive" indicates that a storage modulus E' of $3.0 \times 10^6$ dyne/$cm^2$ or above is required at 25° C., and that a storage modulus E' of $1.0 \times 10^6$ dyne/$cm^2$ or above is required at 105° C.

It is because if the adhesive elasticity curve of the "heat-expandable pressure-sensitive adhesive" has a storage modulus E' of less than $3.0 \times 10^6$ dyne/$cm^2$ at 25° C., the heat-expandable layer 40 will manifest adhesion that meets the requirement of adhesive attachment, but will demonstrate unsatisfactory post-hot-blowing detachability and thus will fail to meet detachment needs. Likewise, given a storage modulus E' of less than $1.0 \times 10^6$ dyne/$cm^2$ at high temperature, that is, 105° C., the heat-expandable layer 40 manifests adhesion to the same extent as it does at 25° C.

The polyester release film layer 50 is a polyester release film that has a release effect and is affixed to the heat-expandable layer 40 so as to protect the heat-expandable layer 40.

The "primer acrylic emulsion" and the "heat-expandable pressure-sensitive adhesive" disclosed in the present invention comprise acrylic emulsion which is synthesized from acrylic monomers and a reactive emulsifier by a special technique. To be specific, the acrylic emulsion is synthesized by emulsion polymerization of major constituents as follows: deionized water, acrylic monomers, an initiator, an emulsifier, a chain-transfer agent, and a pH buffer.

Deionized Water

Emulsion polymerization entails using deionized water. It is because if water used in emulsion polymerization contains metal ions or salts, not only will formation of emulsifier micelles and stability of polymer particles be compromised, but condensation will occur. The deionized water has to be of a pH value between 6 and 8, total hardness of zero, and electrical conductivity below 10, otherwise condensation will occur.

Acrylic Monomers

The selection of the acrylic monomers depends on the required physical properties of the acrylic emulsion. For example, the softness and hardness of the acrylic emulsion finished product are subject to alteration and adjustment by using the acrylic monomers of an appropriate glass transition temperature (Tg). The acrylic monomers of the present invention comprise:

1. alkyl group-containing (meth)acrylic ester is:
 one, or a mixture of at least one, selected from the group consisting of methyl (meth)acrylate, ethyl (meth)acrylate, propyl (meth)acrylate, butyl (meth)acrylate, isobutyl (meth)acrylate, 2-ethylhexyl (meth)acrylate, octyl (meth)acrylate, isooctyl (meth)acrylate, lauryl (meth)acrylate, octadecyl (meth)acrylate, cyclohexyl (meth)acrylate, methoxyethyl (meth)acrylate, and ethoxymethyl (meth)acrylate;

2. hydroxyl group-containing (meth)acrylic ester is:
   one selected from the group consisting of 2-hydroxyethyl (meth)acrylate, 4-hydroxybutyl (meth)acrylate, chloro-2-hydroxypropyl acrylate, diethylene glycol mono(meth)acrylate, and allyl alcohol;
3. carboxyl group-containing (meth)acrylic acid is:
   one selected from the group consisting of acrylic acid, methacrylic acid, itaconic acid, butenoic acid, maleic acid, fumaric acid, and maleic anhydride; and
4. in addition to the aforesaid monomer constituents, other monomers can be added for copolymerization, provided that doing so does not jeopardize the scope of the present invention. For instance, such monomers include vinyl acetate, phenylethene, methyl phenylethene, vinyl toluene, or (meth)acrylonitrile.

Emulsifier

The selection of an emulsifier is of vital importance to emulsion polymerization, as it affects: (1) polymerization speed and conversion rate; (2) polymer particle size; (3) film characteristics; and (4) emulsion stability. The reactive emulsifiers used in the present invention are structurally characterized by carbon-carbon double bonds and can be classified into two types, namely anion emulsifiers and non-ionic emulsifiers. Alternatively, according to the present invention, it is feasible to use a combination of anion emulsifiers and non-ionic emulsifiers.

1. Anion Emulsifiers

Reactive anion emulsifiers are exemplified by PC-10 of Sanyo Chemical Industries, Ltd., MS-2N of Sino-Japan Chemical, NOIGEN RN-20, RN-30, RN-50 of Chin-Yee Chemical Industries Co., Ltd., SDBS95 of Big Sun Chemical Corporation, Maxmul-6112 of Ching Tai, LATEMUL PS, LATEMUL ASK of Kao (Taiwan) Corporation, and non-reactive emulsifier NP6SF of Jiuh Yi Chemical Industrial Co., Ltd.

2. Non-Ionic Emulsifiers

Reactive non-ionic emulsifiers are exemplified by 5010 of Ching Tai and E950 of Sin θ-Japan Chemical.

Initiator

Most of the initiators used in emulsion polymerization are water-soluble, such as hydrogen peroxide ($H_2O_2$), sodium persulfate ($Na_2S_2O_8$), ammomium persulfate (($NH_4$)$_2S_2O_8$), and potassium persulfate ($K_2S_2O_8$). The reducing agents used in emulsion polymerization are, namely sodium bissulfite ($NaHSO_3$), sodium metabissulfite ($Na_2S_2O_8$), and sodium hydrosulfite ($Na_2S_2O_4$).

Other Additives

1. Protective Colloid

Protective colloid is usually composed of polymers and is effective in increasing the viscosity of the water phase in the vicinity of particles so as to protect the particles. In particular, protective colloid is often used in polymerization of hydrophilic monomers. It is because, during the polymerization of hydrophilic monomers, anion emulsifiers, non-ionic emulsifiers, or cation emulsifiers are not able to stabilize the particles but are absorbed thereinto. Hence, protective colloid has to be used in the polymerization of hydrophilic monomers for increasing the viscosity of the water phase in the vicinity of particles so as to protect the particles and allow the reaction to continue. The protective colloid used in the polymerization of hydrophilic monomers is, for example, polyvinyl alcohol (PVA) or cellulose.

2. Chain-transfer Agent

Although emulsion molecular weight can be controlled by adjusting the quantity of the initiator used, it is controlled mostly by means of a chain-transfer agent. A chain-transfer agent stops the growth of polymeric chains and becomes an active free radical itself. A typical chain-transfer agent is a mercaptan, such as n-dodecyl mercaptan or t-dodecyl mercaptan. During the reaction, the required quantity of a chain-transfer agent used accounts for 0.25% to 0.75% of the total quantity of monomers used.

The primer layer and the heat-expandable layer are synthesized from the emulsion obtained by emulsion polymerization and the raw materials described below.

Water-based Cross-linking Agent

The water-based cross-linking agent of the present invention comprises a commercialized chemical, such as a water-based isocyanate-based compound, a water-based epoxy-based compound, an amine-based compound, a metal-chelating-based compound, or an aziridine-based compound, and preferably comprises a water-based isocyanate-based compound. The disclosure in the present invention regarding the water-based cross-linking agent thereof is not limited to the commercialized chemical products described hereunder.

The isocyanate compound comprises isocyanate monomers selected from the group consisting of toluene diisocyanate, chlorobenzene diisocyanate, hexamethylene diisocyanate, tetramethylene diisocyanate, isophorone diisocyanate, xylene diisocyanate, diphenylmethane diisocyanate, and hydrogenated diphenylmethane diisocyanate. Alternatively, the isocyanate compound is manufactured by performing addition reaction on the isocyanate monomer and trimethylolpropane, such as CL (manufactured by Nan Ya Plastics Corporation), isocyanurate, or biuret compound. Alternatively, the isocyanate compound is produced when conventional polyether polyol or polyester polyol, acrylic polyol, polybutadiene polyol, or polyisoprene polyol undergoes an additional reaction with urethane prepolymer-based isocyanate and melamine resin.

Normally, 0.1 to 20, preferably 0.5 to 6 and most preferably 1 to 5, parts by weight of the cross-linking agent is added to 100 parts by weight of acrylic emulsion, namely the "primer acrylic emulsion" or the "heat-expandable pressure-sensitive adhesive".

Blowing Agent

According to the present invention, the blowing agent, which comes in the form of ultrafine spherical plastic powder characterized by a core-shell structure, consists of thermo-expansive microspheres (also known as thermo-expansive microcapsules) comprising a thermoplastic resinous shell and a liquefied hydrocarbon (i.e., a swelling agent) encapsulated in the shell, and has a particle diameter between 6 μm and 50 μm. After being heated up, the thermo-expansive microspheric blowing agent expands quickly, thereby resulting in an at least thirtyfold increase in its volume to therefore achieve a blowing effect. The thermo-expansive microspheric blowing agent which can survive a blowing-expanding temperature between 50° C. and 200° C. is selected according to the actual processing temperature and chosen as needed.

Normally, 0.1 to 30, preferably 0.5 to 20 and most preferably 1 to 15, parts by weight of the blowing agent is added to 100 parts by weight of acrylic emulsion, namely the "heat-expandable pressure-sensitive adhesive". However, it is also feasible to add more than 50 parts by weight of the blowing agent as needed.

Thickener

In addition to the acrylic emulsion of the "primer acrylic emulsion" or the "heat-expandable pressure-sensitive adhesive", a thickener for adjusting viscosity is required for a coating process of the present invention.

Thickeners in wide use are enumerated in the table as follows:

| Type | Powder-like | Solvent | Emulsion |
|---|---|---|---|
| Anionic | Sodium Carboxymethyl Cellulose; Sodium and Ammonia alginate Gunkaraya | Sodium and Ammonia Polyacrylate and Copolymers | Polyacrylates |
| Non-ionic | Methyl Cellulose; Hydroxyethyl Cellulose | Hydroxyethyl Cellulose | |
| Amphoteric | Casein; Soybean protein; Gelatin | | |

Coupling Agent

According to the present invention, the adhesiveness between the substrate layer 20 and the "primer acrylic emulsion" is enhanced by a coupling agent, such as vinyl-containing silane coupling agent, acrylic silane coupling agent, epoxy silane coupling agent, amine silane coupling agent, chlorine-containing silane coupling agent, or alkyl-containing silane coupling agent.

Dye

According to the present invention, dyes of different colors are applicable as needed, namely disperse dyes (such as Sumikaron Orange SE-RPD or Zenix Orange UN-SE) or basic dyes (such as Taiacry Brill Pink GTN or Cathilon Pink FGH).

EMBODIMENTS

Although the technical contents and achievable advantages of the present invention are hereunder illustrated in detail with specific embodiments, the present invention is not limited to the embodiments.

Pre-preparation of "Primer Acrylic Emulsion"

<Sample P1>

As shown in Table 1, 29.77 parts by weight of deionized water and 0.23 parts by weight of sodium bicarbonate are added to a reaction tank, and then nitrogen gas is introduced to the reaction tank for 10 minutes. In nitrogen atmosphere, 0.53 parts by weight of conventional non-reactive anion emulsifier NP6SF, 0.21 parts by weight of conventional non-reactive non-ionic emulsifier E950, 1.5 parts by weight of ethyl acrylate (EA), 2.1 parts by weight of methyl methacrylate (MMA), 0.22 parts by weight of n-butyl α-methacrylate (n-BMA), 0.2 parts by weight of 2-hydroxyethyl acrylate (2-HEA), and 0.04 parts by weight of acrylic acid (AA) are added to the reaction tank and mixed. After the reaction tank temperature has been raised to 80° C., 0.02 parts by weight of hydrophilic initiator ammonium persulfate (APS) dissolved in 1.4 parts by weight of an aqueous solution of water is added to the reaction tank, and then the reacting solution is heated up to reach 85° C. The reaction takes place for 15 minutes to form a seed crystal. Afterward, 21.04 parts by weight of deionized water, 1.17 parts by weight of conventional non-reactive anion emulsifier NP6SF, 0.62 parts by weight of conventional non-ionic emulsifier E950, 13.5 parts by weight of ethyl acrylate (EA), 19.1 parts by weight of methyl methacrylate (MMA), 1.82 parts by weight of n-butyl α-methacrylate (n-BMA), 1.8 parts by weight of 2-hydroxyethyl acrylate (2-HEA), and 0.36 parts by weight of acrylic acid (AA) are mixed with a mixer to form a pre-emulsion. Then, 0.13 parts by weight of hydrophilic initiator ammonium persulfate (APS) is dissolved in 1.4 parts by weight of a deionized water solution. Afterward, the pre-emulsion and the hydrophilic initiator are dispensed to the reaction tank by means of pipe-branching and pipette-dispensing for a pipette-dispensing duration of 4 hours and at 85° C. The reaction continues for 30 minutes before the reaction tank temperature is decreased to 60° C. Afterward, 0.03 parts by weight of lipophilic initiator tert-butyl hydroperoxide (t-BHP) dissolved in 1.4 parts by weight of a deionized water solution is dispensed to the reaction tank by pipette-dispensing for a dispensing duration of 5 minutes, and then the reaction continues for 1 hour. Finally, the reaction tank is cooled down to the room temperature, and the primer acrylic emulsion (P1) with a solid content of 40% or less is extracted.

<Sample P2>

As shown in Table 1, 29.77 parts by weight of deionized water and 0.23 parts by weight of sodium bicarbonate are added to a reaction tank, and then nitrogen gas is introduced to the reaction tank for 10 minutes. In nitrogen atmosphere, 0.5 parts by weight of reactive anion emulsifier PC-10, 1.5 parts by weight of ethyl acrylate (EA), 2.1 parts by weight of methyl methacrylate (MMA), 0.22 parts by weight of n-butyl α-methacrylate (n-BMA), 0.2 parts by weight of 2-hydroxyethyl acrylate (2-HEA), and 0.04 parts by weight of acrylic acid (AA) are added to the reaction tank and mixed. After the reaction tank temperature has been raised to 80° C., 0.02 parts by weight of hydrophilic initiator ammonium persulfate (APS) dissolved in 1.4 parts by weight of an aqueous solution of water is added to the reaction tank, and then the reacting solution is heated up to reach 85° C. The reaction takes place for 15 minutes to form a seed crystal. Afterward, 21.04 parts by weight of deionized water, 3.0 parts by weight of reactive emulsifier PC-10, 13.5 parts by weight of ethyl acrylate (EA), 19.1 parts by weight of methyl methacrylate (MMA), 1.82 parts by weight of n-butyl α-methacrylate (n-BMA), 1.8 parts by weight of 2-hydroxyethyl acrylate (2-HEA), and 0.36 parts by weight of acrylic acid (AA) are mixed with a mixer to form a pre-emulsion. Then, 0.13 parts by weight of hydrophilic initiator ammonium persulfate (APS) is dissolved in 1.4 parts by weight of a deionized water solution. Afterward, the pre-emulsion and the hydrophilic initiator are dispensed to the reaction tank by means of pipe-branching and pipette-dispensing for a pipette-dispensing duration of 4 hours and at 85° C. The reaction continues for 30 minutes before the reaction tank temperature is decreased to 60° C. Afterward, 0.03 parts by weight of lipophilic initiator tert-butyl hydroperoxide (t-BHP) dissolved in 1.4 parts by weight of a deionized water solution is dispensed to the reaction tank by pipette-dispensing for a dispensing duration of 5 minutes, and then the reaction continues for 1 hour. Finally, the reaction tank is cooled down to the room temperature, and the primer acrylic emulsion (P2) with a solid content of 40% or less is extracted.

<Sample P3>

As shown in Table 1, 29.77 parts by weight of deionized water and 0.23 parts by weight of sodium bicarbonate are added to a reaction tank, and then nitrogen gas is introduced to the reaction tank for 10 minutes. In nitrogen atmosphere, 0.5 parts by weight of reactive emulsifier 5010, 1.3 parts by weight of ethyl acrylate (EA), 2.1 parts by weight of methyl methacrylate (MMA), 0.22 parts by weight of n-butyl α-methacrylate (n-BMA), 0.2 parts by weight of 2-hydroxyethyl acrylate (2-HEA), 0.04 parts by weight of acrylic acid (AA), and 0.2 parts by weight of butyl acrylate (BA) are added to the reaction tank and mixed. After the reaction tank temperature has been raised to 80° C., 0.02 parts by weight of hydrophilic initiator ammonium persulfate (APS) dissolved in 1.4 parts by weight of an aqueous solution of water is added to the reaction tank, and then the reacting solution is heated up to reach 85° C. The reaction takes place for 15 minutes to form a seed crystal. Afterward, 21.04 parts by weight of deionized water, 3.0 parts by weight of reactive emulsifier 5010, 11.5 parts by weight of ethyl acrylate (EA), 19.1 parts by weight of methyl methacrylate (MMA), 1.82 parts by weight of n-butyl α-methacrylate (n-BMA), 1.8 parts by weight of 2-hydroxyethyl acrylate (2-HEA), 0.36 parts by weight of acrylic acid (AA), and 2.0 parts by weight of butyl acrylate (BA) are mixed with a mixer to form a pre-emulsion. Then, 0.13 parts by weight of hydrophilic initiator ammonium persulfate (APS) is dissolved in 1.4 parts by weight of a deionized water solution. Afterward, the pre-emulsion and the hydrophilic initiator are dispensed to the reaction tank by means of pipe-branching and pipette-dispensing for a pipette-dispensing duration of 4 hours and at 85° C. The reaction continues for 30 minutes before the reaction tank temperature is decreased to 60° C. Afterward, 0.03 parts by weight of lipophilic initiator tert-butyl hydroperoxide (t-BHP) dissolved in 1.4 parts by weight of a deionized water solution is dispensed to the reaction tank by pipette-dispensing for a dispensing duration of 5 minutes, and then the reaction continues for 1 hour. Finally, the reaction tank is cooled down to the room temperature, and the primer acrylic emulsion (P3) with a solid content of 40% or less is extracted.

<Sample P4>

As shown in Table 1, 29.77 parts by weight of deionized water and 0.23 parts by weight of sodium bicarbonate are added to a reaction tank, and then nitrogen gas is introduced to the reaction tank for 10 minutes. In nitrogen atmosphere, 0.5 parts by weight of reactive emulsifier 6112, 1.0 parts by weight of ethyl acrylate (EA), 2.1 parts by weight of methyl methacrylate (MMA), 0.22 parts by weight of n-butyl α-methacrylate (n-BMA), 0.2 parts by weight of 2-hydroxyethyl acrylate (2-HEA), 0.04 parts by weight of acrylic acid (AA), and 0.5 parts by weight of butyl acrylate (BA) are added to the reaction tank and mixed. After the reaction tank temperature has been raised to 80° C., 0.02 parts by weight of hydrophilic initiator ammonium persulfate (APS) dissolved in 1.4 parts by weight of an aqueous solution of water is added to the reaction tank, and then the reacting solution is heated up to reach 85° C. The reaction takes place for 15 minutes to form a seed crystal. Afterward, 21.04 parts by weight of deionized water, 3.0 parts by weight of reactive emulsifier 6112, 9 parts by weight of ethyl acrylate (EA), 19.1 parts by weight of methyl methacrylate (MMA), 1.82 parts by weight of n-butyl α-methacrylate (n-BMA), 1.8 parts by weight of 2-hydroxyethyl acrylate (2-HEA), 0.36 parts by weight of acrylic acid (AA), and 4.5 parts by weight of butyl acrylate (BA) are mixed with a mixer to form a pre-emulsion. Then, 0.13 parts by weight of hydrophilic initiator ammonium persulfate (APS) is dissolved in 1.4 parts by weight of a deionized water solution. Afterward, the pre-emulsion and the hydrophilic initiator are dispensed to the reaction tank by means of pipe-branching and pipette-dispensing for a pipette-dispensing duration of 4 hours and at 85° C. The reaction continues for 30 minutes before the reaction tank temperature is decreased to 60° C. Afterward, 0.03 parts by weight of lipophilic initiator tert-butyl hydroperoxide (t-BHP) dissolved in 1.4 parts by weight of a deionized water solution is dispensed to the reaction tank by pipette-dispensing for a dispensing duration of 5 minutes, and then the reaction continues for 1 hour. Finally, the finished product is cooled down to the normal temperature, and the primer acrylic emulsion (P4) with a solid content of 40% or less is extracted.

<Sample P5>

As shown in Table 1, 29.77 parts by weight of deionized water and 0.23 parts by weight of sodium bicarbonate are added to a reaction tank, and then nitrogen gas is introduced to the reaction tank for 10 minutes. In nitrogen atmosphere, 0.5 parts by weight of reactive emulsifier RN-20, 0.61 parts by weight of ethyl acrylate (EA), 2.1 parts by weight of methyl methacrylate (MMA), 0.22 parts by weight of n-butyl α-methacrylate (n-BMA), 0.2 parts by weight of 2-hydroxyethyl acrylate (2-HEA), 0.04 parts by weight of acrylic acid (AA), and 0.89 parts by weight of butyl acrylate (BA) are added to the reaction tank and mixed. After the reaction tank temperature has been raised to 80° C., 0.02 parts by weight of hydrophilic initiator sodium persulfate (SPS) dissolved in 1.4 parts by weight of an aqueous solution of water is added to the reaction tank, and then the reacting solution is heated up to reach 85° C. The reaction takes place for 15 minutes to form a seed crystal. Afterward, 21.04 parts by weight of deionized water, 3.0 parts by weight of reactive emulsifier RN-20, 5.5 parts by weight of ethyl acrylate (EA), 10.1 parts by weight of methyl methacrylate (MMA), 10.82 parts by weight of n-butyl α-methacrylate (n-BMA), 1.8 parts by weight of 2-hydroxyethyl acrylate (2-HEA), 0.36 parts by weight of acrylic acid (AA), and 8 parts by weight of butyl acrylate (BA) are mixed with a mixer to form a pre-emulsion. Then, 0.13 parts by weight of hydrophilic initiator sodium persulfate (SPS) is dissolved in 1.4 parts by weight of a deionized water solution. Afterward, the pre-emulsion and the hydrophilic initiator are dispensed to the reaction tank by means of pipe-branching and pipette-dispensing for a pipette-dispensing duration of 4 hours and at 85° C. The reaction continues for 30 minutes before the reaction tank temperature is decreased to 60° C. Afterward, 0.03 parts by weight of lipophilic initiator tert-butyl hydroperoxide (t-BHP) dissolved in 1.4 parts by weight of a deionized water solution is dispensed to the reaction tank by pipette-dispensing for a dispensing duration of 5 minutes, and then the reaction continues for 1 hour. Finally, the finished product is cooled down to the normal temperature, and the primer acrylic emulsion (P5) with a solid content of 40% or less is extracted.

<Sample P6>

As shown in Table 1, 29.77 parts by weight of deionized water and 0.23 parts by weight of sodium bicarbonate are added to a reaction tank, and then nitrogen gas is introduced to the reaction tank for 10 minutes. In nitrogen atmosphere, 0.25 parts by weight of reactive emulsifier PC-10, 0.25 parts by weight of reactive emulsifier 5010, 2.22 parts by weight of methyl methacrylate (MMA), 0.3 parts by weight of 2-hydroxyethyl acrylate (2-HEA), 1.5 parts by weight of butyl acrylate (BA), and 0.04 parts by weight of methacrylic acid (MAA) are added to the reaction tank and mixed. After the reaction tank temperature has been raised to 80° C., 0.02 parts by weight of hydrophilic initiator sodium persulfate (SPS) dissolved in 1.4 parts by weight of an aqueous solution of water is added to the reaction tank, and then the reacting solution is heated up to reach 85° C. The reaction takes place for 15 minutes to form a seed crystal. Afterward, 21.04 parts by weight of deionized water, 1.5 parts by weight of reactive emulsifier PC-10, 1.5 parts by weight of reactive emulsifier 5010, 20.92 parts by weight of methyl methacrylate (MMA), 1.0 parts by weight of 2-hydroxyethyl acrylate (2-HEA), 13.5 parts by weight of butyl acrylate (BA), and 1.16 parts by weight of methacrylic acid (MAA) are mixed with a mixer to form a pre-emulsion. Then, 0.13 parts by weight of hydrophilic initiator sodium persulfate (SPS) is dissolved in 1.4 parts by weight of a deionized water solution. Afterward, the pre-emulsion and the hydrophilic initiator are dispensed to the reaction tank by means of pipe-branching and pipette-dispensing for a pipette-dispensing duration of 4 hours and at 85° C. The reaction continues for 30 minutes before the reaction tank temperature is decreased to 60° C. Afterward, 0.03 parts by weight of lipophilic initiator tert-butyl hydroperoxide (t-BHP) dissolved in 1.4 parts by weight of a deionized water solution is dispensed to the reaction tank by pipette-dispensing for a dispensing duration of 5 minutes, and then the reaction continues for 1 hour. Finally, the finished product is cooled down to the normal temperature, and the primer acrylic emulsion (P6) with a solid content of 40% or less is extracted.

<Sample P7>

As shown in Table 1, 29.77 parts by weight of deionized water and 0.23 parts by weight of sodium bicarbonate are added to a reaction tank, and then nitrogen gas is introduced to the reaction tank for 10 minutes. In nitrogen atmosphere, 0.25 parts by weight of reactive emulsifier 5010, 0.25 parts by weight of reactive emulsifier 6112, 3.82 parts by weight of methyl methacrylate (MMA), 0.2 parts by weight of 2-hydroxyethyl acrylate (2-HEA), and 0.04 parts by weight of methacrylic acid (MAA) are added to the reaction tank and mixed. After the reaction tank temperature has been raised to 80° C., 0.02 parts by weight of hydrophilic initiator sodium persulfate (SPS) dissolved in 1.4 parts by weight of an aqueous solution of water is added to the reaction tank, and then the reacting solution is heated up to reach 85° C. The reaction takes place for 15 minutes to form a seed crystal. Afterward, 21.04 parts by weight of deionized water, 1.5 parts by weight of reactive emulsifier 5010, 1.5 parts by weight of reactive emulsifier 6112, 34.42 parts by weight of methyl methacrylate (MMA), 1.0 parts by weight of 2-hydroxyethyl acrylate (2-IEA), 0.36 parts by weight of acrylic acid (AA), and 0.8 parts by weight of methacrylic acid (MAA) are mixed with a mixer to form a pre-emulsion. Then, 0.13 parts by weight of hydrophilic initiator sodium persulfate (SPS) is dissolved in 1.4 parts by weight of a deionized water solution. Afterward, the pre-emulsion and the hydrophilic initiator are dispensed to the reaction tank by means of pipe-branching and pipette-dispensing for a pipette-dispensing duration of 4 hours and at 85° C. The reaction continues for 30 minutes before the reaction tank temperature is decreased to 60° C. Afterward, 0.03 parts by weight of lipophilic initiator tert-butyl hydroperoxide (t-BHP) dissolved in 1.4 parts by weight of a deionized water solution is dispensed to the reaction tank by pipette-dispensing for a dispensing duration of 5 minutes, and then the reaction continues for 1 hour. Finally, the finished product is cooled down to the normal temperature, and the primer acrylic emulsion (P7) with a solid content of 40% or less is extracted.

<Sample P8>

As shown in Table 1, 29.77 parts by weight of deionized water and 0.23 parts by weight of sodium bicarbonate are added to a reaction tank, and then nitrogen gas is introduced to the reaction tank for 10 minutes. In nitrogen atmosphere, 0.25 parts by weight of reactive emulsifier 6112, 0.25 parts by weight of reactive emulsifier RN-20, 2.01 parts by weight of methyl methacrylate (MMA), 2.01 parts by weight of n-butyl α-methacrylate (n-BMA), and 0.04 parts by weight of methacrylic acid (MAA) are added to the reaction tank and mixed. After the reaction tank temperature has been raised to 80° C., 0.02 parts by weight of hydrophilic initiator sodium persulfate (SPS) dissolved in 1.4 parts by weight of an aqueous solution of water is added to the reaction tank, and then the reacting solution is heated up to reach 85° C. The reaction takes place for 15 minutes to form a seed crystal. Afterward, 21.04 parts by weight of deionized water, 1.5 parts by weight of reactive emulsifier 6112, 1.5 parts by weight of reactive emulsifier RN-20, 17.39 parts by weight of methyl methacrylate (MMA), 17.39 parts by weight of n-butyl α-methacrylate (n-BMA), 1.0 parts by weight of 2-hydroxyethyl acrylate (2-HEA), and 0.8 parts by weight of methacrylic acid (MAA) are mixed with a mixer to form a pre-emulsion. Then, 0.13 parts by weight of hydrophilic initiator sodium persulfate (SPS) is dissolved in 1.4 parts by weight of a deionized water solution. Afterward, the pre-emulsion and the hydrophilic initiator are dispensed to the reaction tank by means of pipe-branching and pipette-dispensing for a pipette-dispensing duration of 4 hours and at 85° C. The reaction continues for 30 minutes before the reaction tank temperature is decreased to 60° C. Afterward, 0.03 parts by weight of lipophilic initiator tert-butyl hydroperoxide (t-BBHP) dissolved in 1.4 parts by weight of a deionized water solution is dispensed to the reaction tank by pipette-dispensing for a dispensing duration of 5 minutes, and then the reaction continues for 1 hour. Finally, the finished product is cooled down to the normal temperature, and the primer acrylic emulsion (PS) with a solid content of 40% or less is extracted.

Pre-preparation of Solvent-based Acrylic Emulsion

<Sample P9>

As shown in Table 1, 15.0 parts by weight of ethyl acrylate (EA), 21.2 parts by weight of methyl methacrylate (MMA), 2.0 parts by weight of 2-hydroxyethyl acrylate (2-HEA), 1.4 parts by weight of n-butyl α-methacrylate (n-BMA), 0.4 parts by weight of acrylic acid (AA), 20 parts by weight of ethyl acetate (EAC), and 0.1 parts by weight of 2,2'-azobisisobutyronitrile (AIBN) are put in a reactor, and then stirred slowly in nitrogen environment after the air inside the reactor has been driven therefrom and replaced with nitrogen. Afterward, the temperature of the reacting solution is raised to 76° C., such that the reaction takes place at the constant temperature of 76° C. for 7 hours. If the viscosity of the reacting solution is high, the reacting solution should be diluted by adding EAC solvent thereto by means of pipette-dispensing. Upon completion of the reaction, the reacted solution is diluted by adding EAC solvent thereto again. Finally, a solvent-based acrylic emulsion (P9) with 40 parts by weight of a solid content is extracted.

TABLE 1

| | | Primer Acrylic Emulsion Synthesis Formula | | | | | | | | |
|---|---|---|---|---|---|---|---|---|---|---|
| | | | Sample | | | | | | | |
| | | | P1 | P2 | P3 | P4 | P5 | P6 | P7 | P8 | P9 |
| | Solvent Type | | water-based emulsion | | | | | | | | EAC |
| initial reagent | deionized water | | 29.77 | 29.77 | 29.77 | 29.77 | 29.77 | 29.77 | 29.77 | 29.77 | EAC: 20 |
| | sodium bicarbonate | | 0.23 | 0.23 | 0.23 | 0.23 | 0.23 | 0.23 | 0.23 | 0.23 | — |
| | emulsifier | NP6SF | 0.53 | — | — | — | — | — | — | — | — |
| | | E950 | 0.21 | — | — | — | — | — | — | — | — |
| | | PC-10 | — | 0.5 | — | — | — | 0.25 | — | — | — |
| | | 5010 | — | — | 0.5 | — | — | 0.25 | 0.25 | — | — |

TABLE 1-continued

Primer Acrylic Emulsion Synthesis Formula

| | Solvent Type | | P1 | P2 | P3 | P4 | P5 | P6 | P7 | P8 | P9 |
|---|---|---|---|---|---|---|---|---|---|---|---|
| | | | | | | water-based emulsion | | | | | EAC |
| | | 6112 | — | — | — | 0.5 | — | — | 0.25 | 0.25 | — |
| | | RN-20 | — | — | — | — | 0.5 | — | — | 0.25 | — |
| | monomer | EA | 1.5 | 1.5 | 1.3 | 1.0 | 0.61 | — | — | — | 15.0 |
| | | MMA | 2.1 | 2.1 | 2.1 | 2.1 | 2.1 | 2.22 | 3.82 | 2.01 | 21.2 |
| | | n-BMA | 0.22 | 0.22 | 0.22 | 0.22 | 0.22 | — | — | 2.01 | 1.4 |
| | | 2-HEA | 0.2 | 0.2 | 0.2 | 0.2 | 0.2 | 0.3 | 0.2 | — | 2.0 |
| | | AA | 0.04 | 0.04 | 0.04 | 0.04 | 0.04 | — | — | — | 0.4 |
| | | BA | — | — | 0.2 | 0.5 | 0.89 | 1.5 | — | — | — |
| | | MAA | — | — | — | — | — | 0.04 | 0.04 | 0.04 | — |
| hydrophilic initiator | deionized water | | 1.4 | 1.4 | 1.4 | 1.4 | 1.4 | 1.4 | 1.4 | 1.4 | — |
| | hydrophilic initiator | APS | 0.02 | 0.02 | 0.02 | 0.02 | — | — | — | — | initiator |
| | | SPS | — | — | — | — | 0.02 | 0.02 | 0.02 | 0.02 | AIBN: 0.1 |
| pre-emulsion | deionized water | | 21.04 | 21.04 | 21.04 | 21.04 | 21.04 | 21.04 | 21.04 | 21.04 | — |
| | emulsifier | NP6SF | 1.17 | — | — | — | — | — | — | — | — |
| | | E950 | 0.62 | — | — | — | — | — | — | — | — |
| | | PC-10 | — | 3.0 | — | — | — | 1.5 | — | — | — |
| | | 5010 | — | — | 3.0 | — | — | 1.5 | 1.5 | — | — |
| | | 6112 | — | — | — | 3.0 | — | — | 1.5 | 1.5 | — |
| | | RN-20 | — | — | — | — | 3.0 | — | — | 1.5 | — |
| | monomer | EA | 13.5 | 13.5 | 11.5 | 9 | 5.5 | — | — | — | — |
| | | MMA | 19.1 | 19.1 | 19.1 | 19.1 | 10.1 | 20.92 | 34.42 | 17.39 | — |
| | | n-BMA | 1.82 | 1.82 | 1.82 | 1.82 | 10.82 | — | — | 17.39 | — |
| | | 2-HEA | 1.8 | 1.8 | 1.8 | 1.8 | 1.8 | 1.0 | 1.0 | 1.0 | — |
| | | AA | 0.36 | 0.36 | 0.36 | 0.36 | 0.36 | — | 0.36 | — | — |
| | | BA | — | — | 2 | 4.5 | 8 | 13.5 | — | — | — |
| | | MAA | — | — | — | — | — | 1.16 | 0.8 | 0.8 | — |
| hydrophilic initiator | deionized water | | 1.4 | 1.4 | 1.4 | 1.4 | 1.4 | 1.4 | 1.4 | 1.4 | — |
| | hydrophilic initiator | APS | 0.13 | 0.13 | 0.13 | 0.13 | — | — | — | — | — |
| | | SPS | — | — | — | — | 0.13 | 0.13 | 0.13 | 0.13 | — |
| lipophilic initiator | deionized water | | 1.4 | 1.4 | 1.4 | 1.4 | 1.4 | 1.4 | 1.4 | 1.4 | — |
| | (t-BHP)/70% | | 0.03 | 0.03 | 0.03 | 0.03 | 0.03 | 0.03 | 0.03 | 0.03 | — |

Pre-Preparation of Acrylic Emulsion for Use in Making "Heat-Expandable Pressure-Sensitive Adhesive"
<Sample WB-1>

As shown in Table 2, 149.4 parts by weight of deionized water and 1.0 parts by weight of sodium bicarbonate are added to a reaction tank, and then nitrogen gas is introduced to the reaction tank for 10 minutes. In nitrogen atmosphere, 0.8 parts by weight of conventional non-reactive anion emulsifier NP6SF, 2 parts by weight of conventional non-ionic emulsifier E950, 5 parts by weight of ethyl acrylate (EA), 5 parts by weight of butyl acrylate (BA), 5 parts by weight of 2-ethylhexyl acrylate (2-EHA), 0.8 parts by weight of methyl methacrylate (MMA), 3 parts by weight of n-butyl α-methacrylate (n-BMA), 1 parts by weight of 2-hydroxyethyl acrylate (2-HEA), and 0.1 parts by weight of acrylic acid (AA) are added to the reaction tank and mixed. After the reaction tank temperature has been raised to 80° C., 0.1 parts by weight of hydrophilic initiator ammonium persulfate (APS) dissolved in 2 parts by weight of an aqueous solution of water is added to the reaction tank, and then the reacting solution is heated up to reach 85° C. The reaction takes place for 15 minutes to form a seed crystal. Afterward, 92 parts by weight of deionized water, 3 parts by weight of conventional non-reactive anion emulsifier NP6SF, 1.5 parts by weight of conventional non-ionic emulsifier E950, 69 parts by weight of ethyl acrylate (EA), 25 parts by weight of butyl acrylate (BA), 44 parts by weight of 2-ethylhexyl acrylate (2-EHA), 7.2 parts by weight of methyl methacrylate (MMA), 25 parts by weight of n-butyl α-methacrylate (n-BMA), 9 parts by weight of 2-hydroxyethyl acrylate (2-HEA), and 0.9 parts by weight of acrylic acid (AA) are mixed with a mixer to form a pre-emulsion. Then, 0.4 parts by weight of hydrophilic initiator ammonium persulfate (APS) is dissolved in 5.4 parts by weight of a deionized water solution. Afterward, the pre-emulsion and the hydrophilic initiator are dispensed to the reaction tank by means of pipe-branching and pipette-dispensing for a pipette-dispensing duration of 4 hours and at 85° C. The reaction continues for 30 minutes before the reaction tank temperature is decreased to 60° C.

Afterward, 0.88 parts by weight of lipophilic initiator tert-butyl hydroperoxide (t-BHP) dissolved in 2 parts by weight of a deionized water solution is dispensed to the reaction tank by pipette-dispensing for a dispensing duration of 5 minutes, and then the reaction continues for 1 hour.

Finally, the finished product is cooled down to the normal temperature, and the water-based acrylic emulsion (WB-1) with 42% solid content or less is extracted.

<Sample WB-2>

As shown in Table 2, 149.4 parts by weight of deionized water and 1.0 parts by weight of sodium bicarbonate are added to a reaction tank, and then nitrogen gas is introduced to the reaction tank for 10 minutes. In nitrogen atmosphere, 0.8 parts by weight of conventional non-reactive anion emulsifier NP6SF, 2 parts by weight of conventional non-ionic emulsifier E950, 10 parts by weight of ethyl acrylate (EA), 5 parts by weight of butyl acrylate (BA), 1 parts by weight of methyl methacrylate (MMA), 3 parts by weight of n-butyl α-methacrylate (n-BMA), 0.8 parts by weight of 2-hydroxyethyl acrylate (2-HEA), and 0.1 parts by weight of acrylic acid (AA) are added to the reaction tank and mixed. After the reaction tank temperature has been raised to 80° C., 0.1 parts by weight of hydrophilic initiator ammonium persulfate (APS) dissolved in 2 parts by weight of an aqueous solution of water is added to the reaction tank, and then the reacting solution is heated up to reach 85° C. The reaction takes place for 15 minutes to form a seed crystal. Afterward, 92 parts by weight of deionized water, 3 parts by weight of conventional non-reactive anion emulsifier NP6SF, 1.5 parts by weight of conventional non-ionic emulsifier E950, 69 parts by weight of ethyl acrylate (EA), 36 parts by weight of butyl acrylate (BA), 33 parts by weight of 2-ethylhexyl acrylate (2-EHA), 7.2 parts by weight of methyl methacrylate (MMA), 25 parts by weight of n-butyl α-methacrylate (n-BMA), 9 parts by weight of 2-hydroxyethyl acrylate (2-HEA), and 0.9 parts by weight of acrylic acid (AA) are mixed with a mixer to form a pre-emulsion. Then, 0.4 parts by weight of hydrophilic initiator ammonium persulfate (APS) is dissolved in 5.4 parts by weight of a deionized water solution. Afterward, the pre-emulsion and the hydrophilic initiator are dispensed to the reaction tank by means of pipe-branching and pipette-dispensing for a pipette-dispensing duration of 4 hours and at 85° C. The reaction continues for 30 minutes before the reaction tank temperature is decreased to 60° C.

Afterward, 0.88 parts by weight of lipophilic initiator tert-butyl hydroperoxide (t-BHP) dissolved in 2 parts by weight of a deionized water solution is dispensed to the reaction tank by pipette-dispensing for a dispensing duration of 5 minutes, and then the reaction continues for 1 hour.

Finally, the finished product is cooled down to the normal temperature, and the water-based acrylic emulsion (WB-2) with 42% solid content or less is extracted.

<Sample WB-3>

As shown in Table 2, 149.4 parts by weight of deionized water and 1.0 parts by weight of sodium bicarbonate are added to a reaction tank, and then nitrogen gas is introduced to the reaction tank for 10 minutes. In nitrogen atmosphere, 0.5 parts by weight of reactive emulsifier PC-10, 10 parts by weight of ethyl acrylate (EA), 7 parts by weight of butyl acrylate (BA), 1 parts by weight of 2-ethylhexyl acrylate (2-EHA), 0.8 parts by weight of methyl methacrylate (MMA), 1 parts by weight of 2-hydroxyethyl acrylate (2-HEA), and 0.1 parts by weight of acrylic acid (AA) are added to the reaction tank and mixed. After the reaction tank temperature has been raised to 80° C., 0.1 parts by weight of hydrophilic initiator ammonium persulfate (APS) dissolved in 2 parts by weight of an aqueous solution of water is added to the reaction tank, and then the reacting solution is heated up to reach 85° C. The reaction takes place for 15 minutes to form a seed crystal. Afterward, 92 parts by weight of deionized water, 3.0 parts by weight of reactive emulsifier PC-10, 70 parts by weight of ethyl acrylate (EA), 49 parts by weight of butyl acrylate (BA), 24 parts by weight of 2-ethylhexyl acrylate (2-EHA), 6.2 parts by weight of methyl methacrylate (MMA), 21 parts by weight of n-butyl α-methacrylate (n-BMA), 9 parts by weight of 2-hydroxyethyl acrylate (2-HEA), and 0.9 parts by weight of acrylic acid (AA) are mixed with a mixer to form a pre-emulsion. Then, 0.4 parts by weight of hydrophilic initiator ammonium persulfate (APS) is dissolved in 5.4 parts by weight of a deionized water solution. Afterward, the pre-emulsion and the hydrophilic initiator are dispensed to the reaction tank by means of pipe-branching and pipette-dispensing for a pipette-dispensing duration of 4 hours and at 85° C. The reaction continues for 30 minutes before the reaction tank temperature is decreased to 60° C.

Afterward, 0.88 parts by weight of lipophilic initiator tert-butyl hydroperoxide (t-BHP) dissolved in 2 parts by weight of a deionized water solution is dispensed to the reaction tank by pipette-dispensing for a dispensing duration of 5 minutes, and then the reaction continues for 1 hour.

Finally, the finished product is cooled down to the normal temperature, and the water-based acrylic emulsion (WB-3) with 42% solid content or less is extracted.

<Sample WB-4>

As shown in Table 2, 149.4 parts by weight of deionized water and 1.0 parts by weight of sodium bicarbonate are added to a reaction tank, and then nitrogen gas is introduced to the reaction tank for 10 minutes. In nitrogen atmosphere, 0.5 parts by weight of reactive emulsifier 5010, 5 parts by weight of 2-ethylhexyl acrylate (2-EHA), 3.7 parts by weight of methyl methacrylate (MMA), 5 parts by weight of methyl acrylate (MA), 1 parts by weight of 2-hydroxyethyl acrylate (2-HEA), 5 parts by weight of vinyl acetate (VAC), and 0.2 parts by weight of acrylic acid (AA) are added to the reaction tank and mixed. After the reaction tank temperature has been raised to 80° C., 0.1 parts by weight of hydrophilic initiator ammonium persulfate (APS) dissolved in 2 parts by weight of an aqueous solution of water is added to the reaction tank, and then the reacting solution is heated up to reach 85° C. The reaction takes place for 15 minutes to form a seed crystal. Afterward, 92 parts by weight of deionized water, 3 parts by weight of reactive emulsifier 5010, 20 parts by weight of ethyl acrylate (EA), 85 parts by weight of butyl acrylate (BA), 10 parts by weight of 2-ethylhexyl acrylate (2-EHA), 10 parts by weight of methyl methacrylate (MMA), 25 parts by weight of n-butyl α-methacrylate (n-BMA), 10 parts by weight of methyl acrylate (MA), 9.2 parts by weight of 2-hydroxyethyl acrylate (2-HEA), 10 parts by weight of vinyl acetate (VAC), and 0.9 parts by weight of acrylic acid (AA) are mixed with a mixer to form a pre-emulsion. Then, 0.4 parts by weight of hydrophilic initiator ammonium persulfate (APS) is dissolved in 5.4 parts by weight of a deionized water solution. Afterward, the pre-emulsion and the hydrophilic initiator are dispensed to the reaction tank by means of pipe-branching and pipette-dispensing for a pipette-dispensing duration of 4 hours and at 85° C. The reaction continues for 30 minutes before the reaction tank temperature is decreased to 60° C.

Afterward, 0.88 parts by weight of lipophilic initiator tert-butyl hydroperoxide (t-BHP) dissolved in 2 parts by weight of a deionized water solution is dispensed to the reaction tank by pipette-dispensing for a dispensing duration of 5 minutes, and then the reaction continues for 1 hour.

Finally, the finished product is cooled down to the normal temperature, and the water-based acrylic emulsion (WB-4) with 42% solid content or less is extracted.

<Sample WB-5>

As shown in Table 2, 149.4 parts by weight of deionized water and 1.0 parts by weight of sodium bicarbonate are added to a reaction tank, and then nitrogen gas is introduced to the reaction tank for 10 minutes. In nitrogen atmosphere, 0.5 parts by weight of reactive emulsifier 6112, 10 parts by weight of 2-ethylhexyl acrylate (2-EHA), 5 parts by weight of methyl methacrylate (MMA), 2 parts by weight of n-butyl α-methacrylate (n-BMA), 2 parts by weight of 2-hydroxyethyl acrylate (2-HEA), 0.8 parts by weight of vinyl acetate (VAC), and 0.1 parts by weight of acrylic acid (AA) are added to the reaction tank and mixed. After the reaction tank temperature has been raised to 80° C., 0.1 parts by weight of hydrophilic initiator ammonium persulfate (APS) dissolved in 2 parts by weight of an aqueous solution of water is added to the reaction tank, and then the reacting solution is heated up to reach 85° C. The reaction takes place for 15 minutes to form a seed crystal. Afterward, 92 parts by weight of deionized water, 3 parts by weight of reactive emulsifier 6112, 10 parts by weight of ethyl acrylate (EA), 100 parts by weight of butyl acrylate (BA), 20 parts by weight of 2-ethylhexyl acrylate (2-EHA), 20 parts by weight of methyl methacrylate (MMA), 9.2 parts by weight of 2-hydroxyethyl acrylate (2-HEA), 20 parts by weight of vinyl acetate (VAC), and 0.9 parts by weight of acrylic acid (AA) are mixed with a mixer to form a pre-emulsion. Then, 0.4 parts by weight of hydrophilic initiator ammonium persulfate (APS) is dissolved in 5.4 parts by weight of a deionized water solution. Afterward, the pre-emulsion and the hydrophilic initiator are dispensed to the reaction tank by means of pipe-branching and pipette-dispensing for a pipette-dispensing duration of 4 hours and at 85° C. The reaction continues for 30 minutes before the reaction tank temperature is decreased to 60° C.

Afterward, 0.88 parts by weight of lipophilic initiator tert-butyl hydroperoxide (t-BHP) dissolved in 2 parts by weight of a deionized water solution is dispensed to the reaction tank by pipette-dispensing for a dispensing duration of 5 minutes, and then the reaction continues for 1 hour.

Finally, the finished product is cooled down to the normal temperature, and the water-based acrylic emulsion (WB-5) with 42% solid content or less is extracted.

<Sample WB-6>

As shown in Table 2, 149.4 parts by weight of deionized water and 1.0 parts by weight of sodium bicarbonate are added to a reaction tank, and then nitrogen gas is introduced to the reaction tank for 10 minutes. In nitrogen atmosphere, 0.4 parts by weight of reactive emulsifier PC-10, 0.4 parts by weight of reactive emulsifier RN-20, 13 parts by weight of ethyl acrylate (EA), 5 parts by weight of 2-ethylhexyl acrylate (2-EHA), 0.8 parts by weight of methyl methacrylate (MMA), 1 parts by weight of 2-hydroxyethyl acrylate (2-HEA), and 0.1 parts by weight of acrylic acid (AA) are added to the reaction tank and mixed. After the reaction tank temperature has been raised to 80° C., 0.1 parts by weight of hydrophilic initiator sodium persulfate (SPS) dissolved in 2 parts by weight of an aqueous solution of water is added to the reaction tank, and then the reacting solution is heated up to reach 85° C. The reaction takes place for 15 minutes to form a seed crystal. Afterward, 92 parts by weight of deionized water, 3 parts by weight of reactive emulsifier RN-20, 90 parts by weight of ethyl acrylate (EA), 44 parts by weight of 2-ethylhexyl acrylate (2-EHA), 36.2 parts by weight of methyl methacrylate (MMA), 9 parts by weight of 2-hydroxyethyl acrylate (2-HEA), and 0.9 parts by weight of acrylic acid (AA) are mixed with a mixer to form a pre-emulsion. Then, 0.4 parts by weight of hydrophilic initiator sodium persulfate (SPS) is dissolved in 5.4 parts by weight of a deionized water solution. Afterward, the pre-emulsion and the hydrophilic initiator are dispensed to the reaction tank by means of pipe-branching and pipette-dispensing for a pipette-dispensing duration of 4 hours and at 85° C. The reaction continues for 30 minutes before the reaction tank temperature is decreased to 60° C.

Afterward, 0.88 parts by weight of lipophilic initiator tert-butyl hydroperoxide (t-BHP) dissolved in 2 parts by weight of a deionized water solution is dispensed to the reaction tank by pipette-dispensing for a dispensing duration of 5 minutes, and then the reaction continues for 1 hour.

Finally, the finished product is cooled down to the normal temperature, and the water-based acrylic emulsion (WB-6) with 42% solid content or less is extracted.

<Sample WB-7>

As shown in Table 2, 149.4 parts by weight of deionized water and 1.0 parts by weight of sodium bicarbonate are added to a reaction tank, and then nitrogen gas is introduced to the reaction tank for 10 minutes. In nitrogen atmosphere, 0.5 parts by weight of reactive emulsifier PC-10, 13 parts by weight of ethyl acrylate (EA), 5 parts by weight of 2-ethylhexyl acrylate (2-EHA), 0.8 parts by weight of methyl methacrylate (MMA), 1 parts by weight of 2-hydroxyethyl acrylate (2-HEA), and 0.1 parts by weight of acrylic acid (AA) are added to the reaction tank and mixed. After the reaction tank temperature has been raised to 80° C., 0.1 parts by weight of hydrophilic initiator sodium persulfate (SPS) dissolved in 2 parts by weight of an aqueous solution of water is added to the reaction tank, and then the reacting solution is heated up to reach 85° C. The reaction takes place for 15 minutes to form a seed crystal. Afterward, 92 parts by weight of deionized water, 3 parts by weight of reactive emulsifier PC-10, 119 parts by weight of ethyl acrylate (EA), 44 parts by weight of 2-ethylhexyl acrylate (2-EHA), 7.2 parts by weight of methyl methacrylate (MMA), 9 parts by weight of 2-hydroxyethyl acrylate (2-HEA), and 0.9 parts by weight of acrylic acid (AA) are mixed with a mixer to form a pre-emulsion. Then, 0.4 parts by weight of hydrophilic initiator sodium persulfate (SPS) is dissolved in 5.4 parts by weight of a deionized water solution. Afterward, the pre-emulsion and the hydrophilic initiator are dispensed to the reaction tank by means of pipe-branching and pipette-dispensing for a pipette-dispensing duration of 4 hours and at 85° C. The reaction continues for 30 minutes before the reaction tank temperature is decreased to 60° C.

Afterward, 0.88 parts by weight of lipophilic initiator tert-butyl hydroperoxide (t-BHP) dissolved in 2 parts by weight of a deionized water solution is dispensed to the reaction tank by pipette-dispensing for a dispensing duration of 5 minutes, and then the reaction continues for 1 hour.

Finally, the finished product is cooled down to the normal temperature, and the water-based acrylic emulsion (WB-7) with 42% solid content or less is extracted.

<Sample WB-8>

As shown in Table 2, 149.4 parts by weight of deionized water and 1.0 parts by weight of sodium bicarbonate are added to a reaction tank, and then nitrogen gas is introduced to the reaction tank for 10 minutes. In nitrogen atmosphere, 0.5 parts by weight of reactive emulsifier PC-10, 13 parts by weight of ethyl acrylate (EA), 5 parts by weight of 2-ethylhexyl acrylate (2-EHA), 0.8 parts by weight of methyl methacrylate (MMA), 1 parts by weight of 2-hydroxyethyl acrylate (2-HEA), and 0.1 parts by weight of acrylic acid (AA) are added to the reaction tank and mixed. After the reaction tank temperature has been raised to 80° C., 0.1 parts by weight of hydrophilic initiator sodium persulfate (SPS) dissolved in 2 parts by weight of an aqueous solution of water is added to the reaction tank, and then the reacting solution is heated up to reach 85° C. The reaction takes place for 15 minutes to form a seed crystal. Afterward, 92 parts by weight of deionized water, 3.8 parts by weight of reactive emulsifier PC-10, 119 parts by weight of ethyl acrylate (EA), 44 parts by weight of 2-ethylhexyl acrylate (2-EHA), 7.2 parts by weight of methyl methacrylate (MMA), 9 parts by weight of 2-hydroxyethyl acrylate (2-HEA), and 0.9 parts by weight of acrylic acid (AA) are mixed with a mixer to form a pre-emulsion. Then, 0.4 parts by weight of hydrophilic initiator sodium persulfate (SPS) is dissolved in 5.4 parts by weight of a deionized water solution. Afterward, the pre-emulsion and the hydrophilic initiator are dispensed to the reaction tank by means of pipe-branching and pipette-dispensing for a pipette-dispensing duration of 4 hours and at 85° C. The reaction continues for 30 minutes before the reaction tank temperature is decreased to 60° C. Afterward, 0.88 parts by weight of lipophilic initiator tert-butyl hydroperoxide (t-BHP) dissolved in 2 parts by weight of a deionized water solution is dispensed to the reaction tank by pipette-dispensing for a dispensing duration of 5 minutes, and then the reaction continues for 1 hour.

Finally, the finished product is cooled down to the normal temperature, and the water-based acrylic emulsion (WB-8) with 42% solid content or less is extracted.

<Sample WB-9>

As shown in Table 2, 149.4 parts by weight of deionized water and 1.0 parts by weight of sodium bicarbonate are added to a reaction tank, and then nitrogen gas is introduced to the reaction tank for 10 minutes. In nitrogen atmosphere, 0.5 parts by weight of reactive emulsifier 5010, 13 parts by weight of ethyl acrylate (EA), 5 parts by weight of 2-ethylhexyl acrylate (2-EHA), 0.8 parts by weight of methyl methacrylate (MMA), 1 parts by weight of 2-hydroxyethyl acrylate (2-HEA), and 0.1 parts by weight of acrylic acid (AA) are added to the reaction tank and mixed. After the reaction tank temperature has been raised to 80° C., 0.1 parts by weight of hydrophilic initiator sodium persulfate (SPS) dissolved in 2 parts by weight of an aqueous solution of water is added to the reaction tank, and then the reacting solution is heated up to reach 85° C. The reaction takes place for 15 minutes to form a seed crystal. Afterward, 92 parts by weight of deionized water, 1.5 parts by weight of reactive emulsifier PC-10, 1.5 parts by weight of reactive emulsifier 5010, 110 parts by weight of ethyl acrylate (EA), 53 parts by weight of 2-ethylhexyl acrylate (2-EHA), 11.2 parts by weight of methyl methacrylate (MMA), 5 parts by weight of 2-hydroxyethyl acrylate (2-HEA), and 0.9 parts by weight of acrylic acid (AA) are mixed with a mixer to form a pre-emulsion. Then, 0.4 parts by weight of hydrophilic initiator sodium persulfate (SPS) is dissolved in 5.4 parts by weight of a deionized water solution. Afterward, the pre-emulsion and the hydrophilic initiator are dispensed to the reaction tank by means of pipe-branching and pipette-dispensing for a pipette-dispensing duration of 4 hours and at 85° C. The reaction continues for 30 minutes before the reaction tank temperature is decreased to 60° C. Afterward, 0.88 parts by weight of lipophilic initiator tert-butyl hydroperoxide (t-BHP) dissolved in 2 parts by weight of a deionized water solution is dispensed to the reaction tank by pipette-dispensing for a dispensing duration of 5 minutes, and then the reaction continues for 1 hour.

Finally, the finished product is cooled down to the normal temperature, and the water-based acrylic emulsion (WB-9) with 42% solid content or less is extracted.

<Sample WB-10>

As shown in Table 2, 149.4 parts by weight of deionized water and 1.0 parts by weight of sodium bicarbonate are added to a reaction tank, and then nitrogen gas is introduced to the reaction tank for 10 minutes. In nitrogen atmosphere, 0.5 parts by weight of reactive emulsifier 6112, 11 parts by weight of ethyl acrylate (EA), 3 parts by weight of 2-ethylhexyl acrylate (2-EHA), 1.8 parts by weight of methyl methacrylate (MMA), 2 parts by weight of methyl acrylate (MA), 1 parts by weight of 2-hydroxyethyl acrylate (2-HEA), 1 parts by weight of vinyl acetate (VAC), and 0.1 parts by weight of acrylic acid (AA) are added to the reaction tank and mixed. After the reaction tank temperature has been raised to 80° C., 0.1 parts by weight of hydrophilic initiator sodium persulfate (SPS) dissolved in 2 parts by weight of an aqueous solution of water is added to the reaction tank, and then the reacting solution is heated up to reach 85° C. The reaction takes place for 15 minutes to form a seed crystal. Afterward, 92 parts by weight of deionized water, 1.5 parts by weight of reactive emulsifier 5010, 1.5 parts by weight of reactive emulsifier 6112, 80 parts by weight of ethyl acrylate (EA), 53 parts by weight of 2-ethylhexyl acrylate (2-EHA), 11.2 parts by weight of methyl methacrylate (MMA), 30 parts by weight of methyl acrylate (MA), 5 parts by weight of 2-hydroxyethyl acrylate (2-HEA), and 0.9 parts by weight of acrylic acid (AA) are mixed with a mixer to form a pre-emulsion. Then, 0.4 parts by weight of hydrophilic initiator sodium persulfate (SPS) is dissolved in 5.4 parts by weight of a deionized water solution. Afterward, the pre-emulsion and the hydrophilic initiator are dispensed to the reaction tank by means of pipe-branching and pipette-dispensing for a pipette-dispensing duration of 4 hours and at 85° C. The reaction continues for 30 minutes before the reaction tank temperature is decreased to 60° C. Afterward, 0.88 parts by weight of lipophilic initiator tert-butyl hydroperoxide (t-BHP) dissolved in 2 parts by weight of a deionized water solution is dispensed to the reaction tank by pipette-dispensing for a dispensing duration of 5 minutes, and then the reaction continues for 1 hour.

Finally, the finished product is cooled down to the normal temperature, and the water-based acrylic emulsion (WB-10) with 42% solid content or less is extracted.

<Sample WB-11>

As shown in Table 2, 149.4 parts by weight of deionized water and 1.0 parts by weight of sodium bicarbonate are added to a reaction tank, and then nitrogen gas is introduced to the reaction tank for 10 minutes. In nitrogen atmosphere, 0.25 parts by weight of reactive emulsifier 5010, 0.25 parts by weight of reactive emulsifier RN20, 8 parts by weight of ethyl acrylate (EA), 3 parts by weight of 2-ethylhexyl acrylate (2-EHA), 1.8 parts by weight of methyl methacrylate (MMA), 2 parts by weight of methyl acrylate (MA), 1 parts by weight of 2-hydroxyethyl acrylate (2-HEA), 4 parts by weight of vinyl acetate (VAC), and 0.1 parts by weight of acrylic acid (AA) are added to the reaction tank and mixed. After the reaction tank temperature has been raised to 80° C., 0.1 parts by weight of hydrophilic initiator sodium persulfate (SPS) dissolved in 2 parts by weight of an aqueous solution of water is added to the reaction tank, and then the reacting solution is heated up to reach 85° C. The reaction takes place for 15 minutes to form a seed crystal. Afterward, 92 parts by weight of deionized water, 1.5 parts by weight of reactive emulsifier 6112, 1.5 parts by weight of reactive emulsifier RN20, 80 parts by weight of ethyl acrylate (EA), 44 parts by weight of 2-ethylhexyl acrylate (2-EHA), 11.2 parts by weight of methyl methacrylate (MMA), 9 parts by weight of n-butyl α-methacrylate (n-BMA), 30 parts by weight of methyl acrylate (MA), 5 parts by weight of 2-hydroxyethyl acrylate (2-HEA), and 0.9 parts by weight of acrylic acid (AA) are mixed with a mixer to form a pre-emulsion. Then, 0.4 parts by weight of hydrophilic initiator sodium persulfate (SPS) is dissolved in 5.4 parts by weight of a deionized water solution. Afterward, the pre-emulsion and the hydrophilic initiator are dispensed to the reaction tank by means of pipe-branching and pipette-dispensing for a pipette-dispensing duration of 4 hours and at 85° C. The reaction continues for 30 minutes before the reaction tank temperature is decreased to 60° C. Afterward, 0.88 parts by weight of lipophilic initiator tert-butyl hydroperoxide (t-BHP) dissolved in 2 parts by weight of a deionized water solution is dispensed to the reaction tank by pipette-dispensing for a dispensing duration of 5 minutes, and then the reaction continues for 1 hour.

Finally, the finished product is cooled down to the normal temperature, and the water-based acrylic emulsion (WB-11) with 42% solid content or less is extracted.

Pre-Preparation of Heat-Expandable Adhesive Resin

<Sample WB-12>

As shown in Table 2, 74 parts by weight of ethyl acrylate (EA), 30 parts by weight of butyl acrylate (BA), 49 parts by weight of 2-ethylhexyl acrylate (2-EHA), 28 parts by weight of n-butyl α-methacrylate (n-BMA), 8 parts by weight of methyl methacrylate (MMA), 10 parts by weight of 2-hydroxyethyl acrylate (2-HEA), 1 parts by weight of acrylic acid (AA), 20 parts by weight of ethyl acetate (EAC), and 0.1 parts by weight of 2,2'-azobisisobutyronitrile (AIBN) are put in a reactor, and then stirred slowly in nitrogen environment after the air inside the reactor has been driven therefrom and replaced with nitrogen.

Afterward, the temperature of the reacting solution is raised to 76° C., such that the reaction takes place at the constant temperature of 76° C. for 7 hours. If the viscosity of the reacting solution is high, the reacting solution should be diluted by adding EAC solvent thereto by means of pipette-dispensing. Upon completion of the reaction, the reacted solution is diluted with EAC solvent again, and the heat-expandable adhesive resin (WB-12) with 42 parts by weight of solid content or less is extracted.

TABLE 2

Heat-expandable Pressure-sensitive Adhesive Synthesis Formula

| | | | WB-1 | WB-2 | WB-3 | WB-4 | WB-5 | WB-6 | WB-7 | WB-8 | WB-9 | WB-10 | WB-11 | WB-12 |
|---|---|---|---|---|---|---|---|---|---|---|---|---|---|---|
| | Solvent Type | | | | | | water-based emulsion | | | | | | | EAC |
| initial reagent | deionized water | | 149.4 | 149.4 | 149.4 | 149.4 | 149.4 | 149.4 | 149.4 | 149.4 | 149.4 | 149.4 | 149.4 | EAC: 20 |
| | sodium bicarbonate | | 1.0 | 1.0 | 1.0 | 1.0 | 1.0 | 1.0 | 1.0 | 1.0 | 1.0 | 1.0 | 1.0 | — |
| | emulsifier | NP6SF | 0.8 | 0.8 | — | — | — | — | — | — | — | — | — | — |
| | | E950 | 2 | 2 | — | — | — | — | — | — | — | — | — | — |
| | | PC-10 | — | — | 0.5 | — | — | 0.4 | 0.5 | 0.5 | — | — | — | — |
| | | 5010 | — | — | — | 0.5 | — | — | — | — | 0.5 | — | 0.25 | — |
| | | 6112 | — | — | — | — | 0.5 | — | — | — | — | 0.5 | — | — |
| | | RN-20 | — | — | — | — | — | 0.4 | — | — | — | — | 0.25 | — |
| | monomer | EA | 5 | 10 | 10 | — | — | 13 | 13 | 13 | 13 | 11 | 8 | 74 |
| | | BA | 5 | 5 | 7 | — | — | — | — | — | — | — | — | 30 |
| | | 2-EHA | 5 | — | 1 | 5 | 10 | 5 | 5 | 5 | 5 | 3 | 3 | 49 |
| | | MMA | 0.8 | 1 | 0.8 | 3.7 | 5 | 0.8 | 0.8 | 0.8 | 0.8 | 1.8 | 1.8 | 8 |
| | | n-BMA | 3 | 3 | — | — | 2 | — | — | — | — | — | — | 28 |
| | | MA | — | — | — | 5 | — | — | — | — | — | 2 | 2 | — |
| | | 2-HEA | 1 | 0.8 | 1 | 1 | 2 | 1 | 1 | 1 | 1 | 1 | 1 | 10 |
| | | VAC | — | — | — | 5 | 0.8 | — | — | — | — | 1 | 4 | — |
| | | AA | 0.1 | 0.1 | 0.1 | 0.2 | 0.1 | 0.1 | 0.1 | 0.1 | 0.1 | 0.1 | 0.1 | 1 |
| hydro-philic initiator | deionized water | | 2 | 2 | 2 | 2 | 2 | 2 | 2 | 2 | 2 | 2 | 2 | |
| | hydrophilic initiator | APS | 0.1 | 0.1 | 0.1 | 0.1 | 0.1 | — | — | — | — | — | — | initiator |
| | | SPS | — | — | — | — | — | 0.1 | 0.1 | 0.1 | 0.1 | 0.1 | 0.1 | AIBN: 0.1 |
| pre-emulsion | deionized water | | 92 | 92 | 92 | 92 | 92 | 92 | 92 | 92 | 92 | 92 | 92 | |
| | emulsifier | NP6SF | 3.0 | 3.0 | — | — | — | — | — | — | — | — | — | |
| | | E950 | 1.5 | 1.5 | — | — | — | — | — | — | — | — | — | |
| | | PC-10 | — | — | 3.0 | — | — | — | 3.0 | 3.8 | 1.5 | — | — | |
| | | 5010 | — | — | — | 3.0 | — | — | — | — | 1.5 | 1.5 | — | |
| | | 6112 | — | — | — | — | 3.0 | — | — | — | — | 1.5 | 1.5 | |
| | | RN-20 | — | — | — | — | — | 3.0 | — | — | — | — | 1.5 | |
| | monomer | EA | 69 | 69 | 70 | 20 | 10 | 90 | 119 | 119 | 110 | 80 | 80 | — |
| | | BA | 25 | 36 | 49 | 85 | 100 | — | — | — | — | — | — | — |
| | | 2-EHA | 44 | 33 | 24 | 10 | 20 | 44 | 44 | 44 | 53 | 53 | 44 | — |
| | | MMA | 7.2 | 7.2 | 6.2 | 10 | 20 | 36.2 | 7.2 | 7.2 | 11.2 | 11.2 | 11.2 | — |
| | | n-BMA | 25 | 25 | 21 | 25 | — | — | — | — | — | — | 9.0 | — |
| | | MA | — | — | — | 10 | — | — | — | — | — | 30 | 30 | — |
| | | 2-HEA | 9 | 9 | 9 | 9.2 | 9.2 | 9 | 9 | 9 | 5 | 5 | 5 | — |
| | | VAC | — | — | — | 10 | 20 | — | — | — | — | — | — | — |
| | | AA | 0.9 | 0.9 | 0.9 | 0.9 | 0.9 | 0.9 | 0.9 | 0.9 | 0.9 | 0.9 | 0.9 | — |
| hydro-philic initiator | deionized water | | 5.4 | 5.4 | 5.4 | 5.4 | 5.4 | 5.4 | 5.4 | 5.4 | 5.4 | 5.4 | 5.4 | — |
| | hydrophilic initiator | APS | 0.4 | 0.4 | 0.4 | 0.4 | 0.4 | — | — | — | — | — | — | |
| | | SPS | — | — | — | — | — | 0.4 | 0.4 | 0.4 | 0.4 | 0.4 | 0.4 | |
| lipophilic initiator | deionized water | | 2 | 2 | 2 | 2 | 2 | 2 | 2 | 2 | 2 | 2 | 2 | — |
| | (t-BHP)/70% | | 0.88 | 0.88 | 0.88 | 0.88 | 0.88 | 0.88 | 0.88 | 0.88 | 0.88 | 0.88 | 0.88 | — |

Disclosed in the embodiments and comparative examples described hereunder is a polyester release film layer which is selectively provided in the form of 38 μm-thick polyester release film manufactured by Nan Ya Plastics Corporation and is the quality in accordance with the specifications as follows:

| Item | Specifications of quality of 38 μm-thick polyester release film |
| --- | --- |
| appearance | no bright spots |
| light transmittance | over 90% |
| release force (g/25 mm) | 8 ± 2 |
| surface roughness | under 0.5 μm |
| residual adhesion rate | over 92% |

Furthermore, in the embodiments and comparative examples described hereunder, the water-based heat-expandable adhesive panel is evaluated, in accordance with the evaluation methods described below, in terms of the adhesiveness of the heat-expandable adhesive panel, post-heating detachability, and adhesive elasticity of the DMA.

Method of Evaluating Adhesion

The method of evaluating adhesion comprises the steps of: cutting the heat-expandable adhesive panel made in the embodiments and comparative examples to form a specimen which is 25 mm wide and 200 mm long; affixing a pressure-sensitive adhesive layer to a stainless steel (SUS304BA) panel (the surface of the stainless steel panel has to be wiped beforehand with an ethyl acetate-soaked clean room fabric); rolling out the specimen with a rubber roller which weighs 2 kg and rolls along the specimen to and fro once at a speed of 300 mm/min, wherein the specimen is fabricated at a temperature of 23±2° C. and relative humidity (RH) of 65±5% for 30 minutes; positioning the specimen on QC-508PA universal tensile strength tester (manufactured by Cometech Testing Machines Co., Ltd. and supplied by NTS Technology Co., Ltd.); setting the stretching speed to 300 mm/min and the angle of detachment to 180o; and measuring the adhesiveness of the heat-expandable adhesive panel while peeling off the heat-expandable adhesive panel. The evaluation results are shown in Table 3.

Method of Evaluating Post-heating Detachability

The method of evaluating post-heating detachability comprises the steps of: coating ceramic slurry on a detachable and treated 38 μm-thick H338 polyester release film; drying the ceramic slurry with an oven to obtain a ceramic sheet of a dry thickness of 10 μm; affixing the ceramic sheet of dimensions of 16 cm×16 cm and the heat-expandable adhesive panel of dimensions of 15 cm×15 cm to each other in a face-to-face manner; rolling out the specimen with a rubber roller which weighs 2 kg and rolls along the specimen to and fro once at a speed of 300 mm/min, wherein the specimen is fabricated at a temperature of 23±2° C. and relative humidity (RH) of 65±5% for 30 minutes; putting the specimen (i.e., the ceramic slurry-affixed adhesive panel) in a temperature-adjustable oven under the conditions of 105° C.×30 seconds, 135° C.×30 seconds, and 190° C.×30 seconds, respectively, to confirm the extent of detachment by visual inspection; and denoting complete detachment with "C", partial detachment with "P", and no detachment with "N", followed by entering the evaluation results in Table 3 directly.

Method of Evaluating Adhesive Elasticity by a Dynamic Mechanical Analyzer (DMA)

The method of evaluating adhesive elasticity by a DMA comprises the steps of: coating a heat-expandable adhesive composition solution on a detachable and treated 38 μm-thick polyester release film surface; drying the polyester release film to form an adhesive sheet having thereon a 1 mm-thick blowing layer; ripening the adhesive sheet at a temperature of 23° C. and relative humidity (RH) of 65% for 7 days to obtain an optical film; cutting out a specimen of dimensions of 5 mm×12.5 mm from the optical film, followed by positioning the specimen on Waters RSA-3 Dynamic Mechanical Analyzer (DMA) (manufactured by the US-based Waters Corporation); and scanning the specimen so as to plot its adhesive elasticity curve of temperature (−100° C.-200° C.) against frequency.

The storage modulus E' at 25° C. and 105° C. is obtained and evaluated, respectively, using the storage modulus curve. The evaluation result is shown in Table 3.

Embodiment 1

As shown in FIG. 1, a 100 μm-thick BH216 polyester film (PET film manufactured by Nan Ya Plastics Corporation) is used as the substrate layer 20 of the water-based heat-expandable adhesive panel 10.

Fabrication of the primer layer 30 comprises the steps of: providing the pre-prepared "primer acrylic emulsion" sample (P1); adding 2 parts by weight of water-based isocyanate-based cross-linking agent 3100 (manufactured by Bayer) and 0.1 part by weight of coupling agent KBM-503 to 100 parts by weight of solid content of sample (P1), followed by mixing the water-based isocyanate-based cross-linking agent 3100, the coupling agent KBM-503, and the solid content of sample (P1) to form the "primer acrylic emulsion"; coating the formed "primer acrylic emulsion" directly on the substrate layer 20 that has already received surface treatment; and drying the "primer acrylic emulsion" so as to obtain a semi-finished product, that is, the having the BH216 polyester film thereon with a total thickness between 110 μm and 150 μm, wherein the primer layer 30 is of a thickness between 10 μm and 50 μm.

Afterward, fabrication of the heat-expandable layer 40 comprises the steps of: providing the pre-prepared acrylic emulsion sample (WB-1) of the "heat-expandable pressure-sensitive adhesive"; adding 1 part by weight of water-based isocyanate-based cross-linking agent 3100 (manufactured by Bayer), 2 parts by weight of blowing agent ES-81D, and 0.2 part by weight of the dye UN-SE to 100 parts by weight of solid content of sample (WB-1), followed by mixing the water-based isocyanate-based cross-linking agent 3100, the blowing agent ES-81D, the dye UN-SE, and the solid content of sample (WB-1) to form the "heat-expandable pressure-sensitive adhesive"; coating the formed "heat-expandable pressure-sensitive adhesive" directly on the aforesaid semi-finished product having the primer layer 30; drying the formed "heat-expandable pressure-sensitive adhesive" to form the heat-expandable layer 40; and affixing the 38 μm-thick polyester release film layer 50 to the heat-expandable layer 40, so as to finalize the water-based heat-expandable adhesive panel 10 (i.e., the finished product) of a total thickness between 190 μm and 210 μm.

Upon evaluation of the adhesiveness of the finished product, the findings regarding post-heating detachability and adhesive elasticity of the DMA are shown in Table 3.

Embodiment 2

Embodiment 2 differs from embodiment 1 in that, in embodiment 2, 4 parts by weight of water-based isocyanate-based cross-linking agent 3100 is added to the "primer acrylic emulsion" in order to fabricate the primer layer 30, and 3 parts by weight of blowing agent ES-81D is added to the "heat-expandable pressure-sensitive adhesive" in order to fabricate the heat-expandable layer 40.

The results of the evaluation of the finished product's adhesiveness, post-heating detachability, and adhesive elasticity of the DMA are shown in Table 3.

Embodiment 3

Embodiment 3 differs from embodiment 2 in that, in embodiment 3, the pre-prepared "primer acrylic emulsion" (P2) substitutes for the "primer acrylic emulsion" used in fabrication of the primer layer 30, and 4 parts by weight of blowing agent ES-81D is added to the pre-prepared acrylic emulsion sample (WB-2) of the "heat-expandable pressure-sensitive adhesive" in order to fabricate the heat-expandable layer 40.

The results of the evaluation of the finished product's adhesiveness, post-heating detachability, and adhesive elasticity of the DMA are shown in Table 3.

Embodiment 4

Embodiment 4 differs from embodiment 3 in that, in embodiment 4, 5.5 parts by weight of blowing agent ES-81D is added to the pre-prepared acrylic emulsion sample (WB-3) of the "heat-expandable pressure-sensitive adhesive" in order to fabricate the heat-expandable layer 40.

The results of the evaluation of the finished product's adhesiveness, post-heating detachability, and adhesive elasticity of the DMA are shown in Table 3.

Embodiment 5

Embodiment 5 differs from embodiment 4 in that, in embodiment 5, 3 parts by weight of water-based isocyanate-based cross-linking agent 3100 is added to the "primer acrylic emulsion" in order to fabricate the primer layer 30, and 7 parts by weight of blowing agent ES-81D is added to the "heat-expandable pressure-sensitive adhesive" in order to fabricate the heat-expandable layer 40.

The results of the evaluation of the finished product's adhesiveness, post-heating detachability, and adhesive elasticity of the DMA are shown in Table 3.

Embodiment 6

Embodiment 6 differs from embodiment 3 in that, in embodiment 6, 3 parts by weight of water-based melamine-based cross-linking agent MH is added to the "primer acrylic emulsion" in order to fabricate the primer layer 30, and 0.5 part by weight of water-based melamine-based cross-linking agent MH is added to the pre-prepared acrylic emulsion sample (WB-3) of the "heat-expandable pressure-sensitive adhesive" in order to fabricate the heat-expandable layer 40.

The results of the evaluation of the finished product's adhesiveness, post-heating detachability, and adhesive elasticity of the DMA are shown in Table 3.

Embodiment 7

Embodiment 7 differs from embodiment 6 in that, in embodiment 7, 1 part by weight of water-based melamine-based cross-linking agent MH is added to the pre-prepared acrylic emulsion sample (WB-4) of the "heat-expandable pressure-sensitive adhesive" in order to fabricate the heat-expandable layer 40.

The results of the evaluation of the finished product's adhesiveness, post-heating detachability, and adhesive elasticity of the DMA are shown in Table 3.

Embodiment 8

Embodiment 8 differs from embodiment 6 in that, in embodiment 8, 2 parts by weight of water-based melamine-based cross-linking agent MH is added to the pre-prepared acrylic emulsion sample (WB-5) of the "heat-expandable pressure-sensitive adhesive" in order to fabricate the heat-expandable layer 40.

The results of the evaluation of the finished product's adhesiveness, post-heating detachability, and adhesive elasticity of the DMA are shown in Table 3.

Embodiment 9

Embodiment 9 differs from embodiment 6 in that, in embodiment 9, the pre-prepared "primer acrylic emulsion" sample (P3) substitutes for the "primer acrylic emulsion" used in fabrication of the primer layer 30, and 4 parts by weight of water-based melamine-based cross-linking agent MH is added to the pre-prepared acrylic emulsion sample (WB-6) of the "heat-expandable pressure-sensitive adhesive" in order to fabricate the heat-expandable layer 40.

The results of the evaluation of the finished product's adhesiveness, post-heating detachability, and adhesive elasticity of the DMA are shown in Table 3.

Embodiment 10

Embodiment 10 differs from embodiment 8 in that, in embodiment 10: the pre-prepared "primer acrylic emulsion" sample (P4) substitutes for the "primer acrylic emulsion" used in fabrication of the primer layer 30, and coupling agent KBM-403 is required for fabrication of the primer layer 30; and blowing agent ES-35GS is added to the pre-prepared acrylic emulsion sample (WB-7) of the "heat-expandable pressure-sensitive adhesive" used in fabrication of the heat-expandable layer 40.

The results of the evaluation of the finished product's adhesiveness, post-heating detachability, and adhesive elasticity of the DMA are shown in Table 3.

Embodiment 11

Embodiment 11 differs from embodiment 10 in that, in embodiment 11, the pre-prepared "primer acrylic emulsion" sample (P5) substitutes for the "primer acrylic emulsion" used in fabrication of the primer layer 30, and the pre-prepared acrylic emulsion sample (WB-8) of the "heat-expandable pressure-sensitive adhesive" is used in fabrication of the heat-expandable layer 40.

The results of the evaluation of the finished product's adhesiveness, post-heating detachability, and adhesive elasticity of the DMA are shown in Table 3.

Embodiment 12

Embodiment 12 differs from embodiment 10 in that, in embodiment 12: the pre-prepared "primer acrylic emulsion" sample (P6) substitutes for the "primer acrylic emulsion" used in fabrication of the primer layer 30, and coupling agent KBM-603 is required for fabrication of the primer layer 30; the pre-prepared acrylic emulsion sample (WB-9) of the "heat-expandable pressure-sensitive adhesive" substitutes for the "heat-expandable pressure-sensitive adhesive" used in fabrication of the heat-expandable layer 40, and blowing agent ESD-305SP is required for fabrication of the heat-expandable layer 40.

The results of the evaluation of the finished product's adhesiveness, post-heating detachability, and adhesive elasticity of the DMA are shown in Table 3.

Embodiment 13

Embodiment 13 differs from embodiment 12 in that, in embodiment 13, the pre-prepared "primer acrylic emulsion" sample (P7) substitutes for the "primer acrylic emulsion" used in fabrication of the primer layer 30, and the pre-prepared acrylic emulsion sample (WB-10) of the "heat-expandable pressure-sensitive adhesive" substitutes for the "heat-expandable pressure-sensitive adhesive" used in fabrication of the heat-expandable layer 40.

The results of the evaluation of the finished product's adhesiveness, post-heating detachability, and adhesive elasticity of the DMA are shown in Table 3.

Embodiment 14

Embodiment 14 differs from embodiment 12 in that, in embodiment 14, the pre-prepared "primer acrylic emulsion" sample (P8) substitutes for the "primer acrylic emulsion" used in fabrication of the primer layer 30, and the pre-prepared acrylic emulsion sample (WB-11) of the "heat-expandable pressure-sensitive adhesive" substitutes for the "heat-expandable pressure-sensitive adhesive" used in fabrication of the heat-expandable layer 40.

The results of the evaluation of the finished product's adhesiveness, post-heating detachability, and adhesive elasticity of the DMA are shown in Table 3.

Comparative Example 1

Comparative example 1 differs from embodiment 1 in that, the primer layer 30 in comparative example 1 is not formed on top of the substrate layer 20; water-based melamine-based cross-linking agent MH is added to the "heat-expandable pressure-sensitive adhesive" used in fabrication of the heat-expandable layer 40; and 4 parts by weight of blowing agent ES-81D is required.

The results of the evaluation of the finished product's adhesiveness, post-heating detachability, and adhesive elasticity of the DMA are shown in Table 3.

Comparative Example 2

Comparative example 2 differs from comparative example 1 in that, in comparative example 2, the pre-prepared acrylic emulsion sample (WB-7) of the "heat-expandable pressure-sensitive adhesive" substitutes for the "heat-expandable pressure-sensitive adhesive" used in fabrication of the heat-expandable layer 40.

The results of the evaluation of the finished product's adhesiveness, post-heating detachability, and adhesive elasticity of the DMA are shown in Table 3.

Comparative Example 3

Comparative example 3 differs from embodiment 1 in that, in comparative example 3, fabrication of the primer layer 30 entails: providing the pre-prepared "primer acrylic emulsion" sample (P9); adding 3 parts by weight of solvent-based isocyanate-based cross-linking agent CL and 0.1 part by weight of coupling agent KBM-503 to 100 parts by weight of solid content of sample (P9); mixing the solvent-based isocyanate-based cross-linking agent CL, the coupling agent KBM-503, and the solid content of sample (P9) to form the "primer acrylic emulsion"; coating the formed "primer acrylic emulsion" directly on the substrate layer 20 which has already received surface treatment; and drying the formed "primer acrylic emulsion" to fabricate a semi-finished product having BH216 polyester film thereon and being of a total thickness between 110 μm and 150 μm, wherein the primer layer 30 is of a thickness between 10 μm and 50 μm.

Comparative example 3 differs from embodiment 1 in that, in comparative example 3, fabrication of the heat-expandable layer 40 entails: providing the pre-prepared heat-expandable resin sample (WB-12); adding 1 part by weight of solvent-based isocyanate-based cross-linking agent CL and 4 parts by weight of blowing agent ES-81D to 100 parts by weight of solid content of sample (WB-12) without adding any dye thereto; mixing the solvent-based isocyanate-based cross-linking agent CL, the blowing agent ES-81D, and the solid content of sample (WB-12) so as to form the "heat-expandable pressure-sensitive adhesive"; coating the formed "heat-expandable pressure-sensitive adhesive" directly on a semi-finished product having the primer layer 30; drying the formed "heat-expandable pressure-sensitive adhesive" to form the heat-expandable layer 40; affixing the 38 μm-thick polyester release film layer 50 to the heat-expandable layer 40, so as to finalize the water-based heat-expandable adhesive panel 10 (i.e., the finished product) of a total thickness between 190 μm and 210 μm.

The results of the evaluation of the finished product's adhesiveness, post-heating detachability, and adhesive elasticity of the DMA are shown in Table 3.

TABLE 3

Processing Formula and Evaluation Result

| | | | | Embodiment | | | | | | |
|---|---|---|---|---|---|---|---|---|---|---|
| | Units: Parts by weight | | | 1 | 2 | 3 | 4 | 5 | 6 | 7 |
| Processing Formula | Primer | Sample | P1 | 100 | 100 | — | — | — | — | — |
| | | | P2 | — | — | 100 | 100 | 100 | 100 | 100 |
| | | | P3 | — | — | — | — | — | — | — |
| | | | P4 | — | — | — | — | — | — | — |
| | | | P5 | — | — | — | — | — | — | — |
| | | | P6 | — | — | — | — | — | — | — |
| | | | P7 | — | — | — | — | — | — | — |
| | | | P8 | — | — | — | — | — | — | — |
| | | | P9 | — | — | — | — | — | — | — |

TABLE 3-continued

Processing Formula and Evaluation Result

|  |  |  |  |  |  |  |  |  |  |  |
|---|---|---|---|---|---|---|---|---|---|---|
|  |  | water-based | 3100 | 2 | 4 | 4 | 4 | 3 | — | — |
|  |  | cross-linking | MH | — | — | — | — | — | 3 | 3 |
|  |  | agent | CL | — | — | — | — | — | — | — |
|  |  | coupling | 403 | — | — | — | — | — | — | — |
|  |  | agent | 503 | 0.1 | 0.1 | 0.1 | 0.1 | 0.1 | 0.1 | 0.1 |
|  |  | (KBM-###) | 603 | — | — | — | — | — | — | — |
|  | Heat- | foam | WB-1 | 100 | 100 | — | — | — | — | — |
|  | expandable | emulsion | WB-2 | — | — | 100 | — | — | — | — |
|  |  |  | WB-3 | — | — | — | 100 | 100 | 100 | — |
|  |  |  | WB-4 | — | — | — | — | — | — | 100 |
|  |  |  | WB-5 | — | — | — | — | — | — | — |
|  |  |  | WB-6 | — | — | — | — | — | — | — |
|  |  |  | WB-7 | — | — | — | — | — | — | — |
|  |  |  | WB-8 | — | — | — | — | — | — | — |
|  |  |  | WB-9 | — | — | — | — | — | — | — |
|  |  |  | WB-10 | — | — | — | — | — | — | — |
|  |  |  | WB-11 | — | — | — | — | — | — | — |
|  |  |  | WB-12 | — | — | — | — | — | — | — |
|  |  | water-based | 3100 | 1 | 1 | 1 | 1 | 1 | — | — |
|  |  | cross-linking | MH | — | — | — | — | — | 0.5 | 1 |
|  |  | agent | CL | — | — | — | — | — | — | — |
|  |  | blowing | ES-81D | 2 | 3 | 4 | 5.5 | 7 | 4 | 4 |
|  |  | agent | ES-35GS | — | — | — | — | — | — | — |
|  |  |  | ESD-305SP | — | — | — | — | — | — | — |
|  |  | dye | UN-SE | 0.2 | 0.2 | 0.2 | 0.2 | 0.2 | 0.2 | 0.2 |
| Properties Evaluation | Adhesion | pre-heating adhesion (g/25 mm) |  | 208 | 143 | 61 | 43 | 24 | 122 | 102 |
|  |  | pre-heating adhesion evaluation |  | H | H | M | L | L | H | H |
|  |  | post-heating detachability |  | N | P | C | C | C | C | C |
|  | DMA storage modulus E' ($10^6 \times$ dyne/cm$^2$) of heat-expandable adhesive | 25° C. |  | 2.88 | 3.21 | 3.69 | 4.14 | 4.23 | 4.05 | 3.95 |
|  |  | 105° C. |  | 0.54 | 0.75 | 1.27 | 1.51 | 1.33 | 1.20 | 1.81 |

|  |  |  |  | Embodiment |  |  |  |  |  |  |
|---|---|---|---|---|---|---|---|---|---|---|
| Units: Parts by weight |  |  |  | 8 | 9 | 10 | 11 | 12 | 13 | 14 |
| Processing Formula | Primer | Sample | P1 | — | — | — | — | — | — | — |
|  |  |  | P2 | 100 | — | — | — | — | — | — |
|  |  |  | P3 | — | 100 | — | — | — | — | — |
|  |  |  | P4 | — | — | 100 | — | — | — | — |
|  |  |  | P5 | — | — | — | 100 | — | — | — |
|  |  |  | P6 | — | — | — | — | 100 | — | — |
|  |  |  | P7 | — | — | — | — | — | 100 | — |
|  |  |  | P8 | — | — | — | — | — | — | 100 |
|  |  |  | P9 | — | — | — | — | — | — | — |
|  |  | water-based | 3100 | — | — | — | — | — | — | — |
|  |  | cross-linking | MH | 3 | 3 | 3 | 3 | 3 | 3 | 3 |
|  |  | agent | CL | — | — | — | — | — | — | — |
|  |  | coupling | 403 | — | — | 0.1 | 0.1 | — | — | — |
|  |  | agent | 503 | 0.1 | 0.1 | — | — | — | — | — |
|  |  | (KBM-###) | 603 | — | — | — | — | 0.1 | 0.1 | 0.1 |
|  | Heat- | foam | WB-1 | — | — | — | — | — | — | — |
|  | expandable | emulsion | WB-2 | — | — | — | — | — | — | — |
|  |  |  | WB-3 | — | — | — | — | — | — | — |
|  |  |  | WB-4 | — | — | — | — | — | — | — |
|  |  |  | WB-5 | 100 | — | — | — | — | — | — |
|  |  |  | WB-6 | — | 100 | — | — | — | — | — |
|  |  |  | WB-7 | — | — | 100 | — | — | — | — |
|  |  |  | WB-8 | — | — | — | 100 | — | — | — |
|  |  |  | WB-9 | — | — | — | — | 100 | — | — |
|  |  |  | WB-10 | — | — | — | — | — | 100 | — |
|  |  |  | WB-11 | — | — | — | — | — | — | 100 |
|  |  |  | WB-12 | — | — | — | — | — | — | — |

TABLE 3-continued

Processing Formula and Evaluation Result

|  |  |  |  |  |  |  |  |  |  |  |
|---|---|---|---|---|---|---|---|---|---|---|
|  |  | water-based | 3100 | — | — | — | — | — | — | — |
|  |  | cross-linking | MH | 2 | 4 | 2 | 2 | 2 | 2 | 2 |
|  |  | agent | CL | — | — | — | — | — | — | — |
|  |  | blowing | ES-81D | 4 | 4 | — | — | — | — | — |
|  |  | agent | ES-35GS | — | — | 4 | 4 | — | — | — |
|  |  |  | ESD-305SP | — | — | — | — | 4 | 4 | 4 |
|  |  | dye | UN-SE | 0.2 | 0.2 | 0.2 | 0.2 | 0.2 | 0.2 | 0.2 |
| Properties Evaluation | Adhesion | pre-heating adhesion (g/25 mm) |  | 86 | 78 | 105 | 92 | 82 | 78 | 71 |
|  |  | pre-heating adhesion evaluation |  | H | H | H | H | H | H | H |
|  |  | post-heating detachability |  | C | C | C | C | C | C | C |
|  | DMA storage modulus E' ($10^6 \times$ dyne/cm$^2$) of heat-expandable adhesive | 25° C. |  | 3.02 | 5.16 | 4.32 | 4.46 | 4.55 | 4.20 | 3.88 |
|  |  | 105° C. |  | 1.20 | 1.41 | 1.45 | 1.52 | 1.62 | 1.22 | 1.16 |

|  |  |  |  | Comparative Embodiment | | |
|---|---|---|---|---|---|---|
| Units: Parts by weight | | | | 1 | 2 | 3 |
| Processing Formula | Primer | Sample | P1 | — | — | — |
|  |  |  | P2 | — | — | — |
|  |  |  | P3 | — | — | — |
|  |  |  | P4 | — | — | — |
|  |  |  | P5 | — | — | — |
|  |  |  | P6 | — | — | — |
|  |  |  | P7 | — | — | — |
|  |  |  | P8 | — | — | — |
|  |  |  | P9 | — | — | 100 |
|  |  | water-based | 3100 | — | — | — |
|  |  | cross-linking | MH | — | — | — |
|  |  | agent | CL | — | — | 3 |
|  |  | coupling agent (KBM-###) | 403 | — | — | — |
|  |  |  | 503 | — | — | 0.1 |
|  |  |  | 603 | — | — | — |
| Heat-expandable | foam emulsion | WB-1 |  | 100 | — | — |
|  |  | WB-2 |  | — | — | — |
|  |  | WB-3 |  | — | — | — |
|  |  | WB-4 |  | — | — | — |
|  |  | WB-5 |  | — | — | — |
|  |  | WB-6 |  | — | — | — |
|  |  | WB-7 |  | — | 100 | — |
|  |  | WB-8 |  | — | — | — |
|  |  | WB-9 |  | — | — | — |
|  |  | WB-10 |  | — | — | — |
|  |  | WB-11 |  | — | — | — |
|  |  | WB-12 |  | — | — | 100 |
|  |  | water-based | 3100 | — | — | — |
|  |  | cross-linking | MH | 1 | 1 | — |
|  |  | agent | CL | — | — | 1 |
|  |  | blowing | ES-81D | 4 | 4 | 4 |
|  |  | agent | ES-35GS | — | — | — |
|  |  |  | ESD-305SP | — | — | — |
|  |  | dye | UN-SE | 0.2 | 0.2 | — |

TABLE 3-continued

| | | Processing Formula and Evaluation Result | | | | |
|---|---|---|---|---|---|---|
| Properties Evaluation | Adhesion | pre-heating adhesion (g/25 mm) | | 196 | 103 | 64 |
| | | pre-heating adhesion evaluation | | H | H | M |
| | | post-heating detachability | | N | P | P |
| | DMA storage modulus E' ($10^6 \times$ dyne/cm$^2$) of heat-expandable adhesive | | 25° C. | 1.93 | 2.55 | 1.42 |
| | | | 105° C. | 0.89 | 1.17 | 0.38 |

Remarks:
ES-81D blowing at 105° C., ES-35GS blowing at 135° C. and ESD-305SP blowing at 190° C.
Pre-heating adhesion evaluation:
"H": denotes high adhesive strength;
"M": denotes moderate adhesive strength; and
"L": denotes low adhesive strength.
Post-heating detachability:
"C": denotes complete separation;
"P": denotes partial separation; and
"N": denotes no separation.

Evaluation Results

1. As shown in Table 1, Table 2, and Table 3, in embodiment 1 and embodiment 2, both the "primer acrylic emulsion" and the "heat-expandable pressure-sensitive adhesive" comprise an emulsion synthesized from a known conventional emulsifier. A water-based liquid-state coating is synthesized in the presence of a water-based isocyanate cross-linking agent, a coupling agent, a blowing agent, ES-81D, and a dye in accordance with the processing formula shown in Table 3, so as to synthesize the water-based heat-expandable adhesive panel (i.e., the finished product) of the present invention. Although the emulsifier content is low, the finished product is analyzed with the DMA, and its analysis curve yields a storage modulus E' of $0.54 \times 10^6$-$0.75 \times 10^6$ dyne/cm$^2$ at 105° C., indicating that its pre-heating adhesion ranges between 143 g/25 mm and 208 g/25 mm, which meets the requirement of processing adhesive attachment, but reveals that its post-heating detachability is unsatisfactory, thereby not meeting the strict requirements of heating-induced detachment.

2. In embodiment 3, the "primer acrylic emulsion" uses a water-based liquid-state coating synthesized from a reactive emulsifier, and the "heat-expandable pressure-sensitive adhesive" uses an emulsion synthesized from a known conventional emulsifier, and then a water-based liquid-state coating is synthesized in the presence of a water-based isocyanate cross-linking agent, a coupling agent, a blowing agent, ES-81D, and a dye in accordance with the processing formula shown in Table 3, so as to synthesize the water-based heat-expandable adhesive panel (i.e., the finished product) of the present invention. The finished product is analyzed with the DMA, and its analysis curve yields a storage modulus E' of $1.27 \times 10^6$ dyne/cm$^2$ at 105° C., indicating high post-heating detachability and good performance, but reveals that pre-heating adhesion is of a slightly undesirable low level of 61 g/25 mm, thereby not meeting pre-heating adhesion requirement.

3. In embodiment 4 and embodiment 5, a water-based isocyanate cross-linking agent, a coupling agent, a blowing agent, ES-81D, and a dye are, according to the processing formulae shown in Table 3, added to the "primer acrylic emulsion" and the "heat-expandable pressure-sensitive adhesive" synthesized by means of various reactive emulsifiers, respectively, so as to form a water-based liquid-state coating and thereby fabricate the water-based heat-expandable adhesive panel (i.e., the finished product) of the present invention. The finished product is analyzed with the DMA, and its analysis curve yields a storage modulus E' of $1.33 \times 10^6$-$1.51 \times 10^6$ dyne/cm$^2$ at 105° C., indicating high post-heating detachability and good performance, but reveals that pre-heating adhesion is of an undesirably low level of 24-43 g/25 mm, thereby not meeting pre-heating adhesion requirement.

4. In embodiment 6 through embodiment 9, the "primer acrylic emulsion" and the "heat-expandable pressure-sensitive adhesive" are synthesized by means of various reactive emulsifiers. A water-based melamine cross-linking agent and a coupling agent are added to the "primer acrylic emulsion" so as to form a water-based liquid-state coating. A blowing agent, ES-81D, a dye, and water-based melamine cross-linking agents of different dosages are added to the "heat-expandable pressure-sensitive adhesive" so as to form a water-based liquid-state coating. In so doing, the water-based heat-expandable adhesive panel (i.e., the finished product) of the present invention is fabricated. The finished product is analyzed with the DMA, and its analysis curve yields a storage modulus E' of $1.20 \times 10^6$-$1.81 \times 10^6$ dyne/cm$^2$ at 105° C., indicating high post-heating detachability and good performance, and reveals that the pre-heating adhesion of the finished product ranges between 78 g/25 mm and 122 g/25 mm, thereby meeting pre-heating adhesion requirement.

5. In embodiment 10 and embodiment 11, a water-based melamine cross-linking agent, a coupling agent, a dye, blowing agents of different blowing temperatures, and ES-35GS are, according to the processing formulae shown in Table 3, added to the "primer acrylic emulsion" and the "heat-expandable pressure-sensitive adhesive" synthesized by means of reactive emulsifiers of the same type but different dosages, respectively, so as to form a water-based liquid-state coating and thereby fabricate the water-based heat-expandable adhesive panel (i.e., the finished product) of the present invention. The finished product is analyzed with the DMA, and its analysis curve yields a storage modulus E' of $1.45 \times 10^6$-$1.52 \times 10^6$ dyne/cm$^2$ at 105° C., indicating high post-heating detachability and good performance, and reveals that the pre-heating adhesion of the finished product ranges between 92 g/25 mm and 105 g/25 mm, thereby meeting pre-heating adhesion requirement.

6. In embodiment 12 through embodiment 14, a water-based melamine cross-linking agent, a coupling agent, a dye, blowing agents of different blowing temperatures, and ESD-305SP are, according to the processing formulae shown in Table 3, added to the "primer acrylic emulsion" and the "heat-expandable pressure-sensitive adhesive" synthesized by means of at least two types of reactive emulsifiers, respectively, so as to form a water-based liquid-state coating and thereby fabricate the water-based heat-expandable adhesive panel (i.e., the finished product) of the present invention. The finished product is analyzed with the DMA, and its analysis curve yields a storage modulus E' of $1.16 \times 10^6$-$1.62 \times 10^6$ dyne/cm$^2$ at 105° C., indicating high post-heating detachability and good performance, and reveals that the pre-heating adhesion of the finished product ranges between 71 g/25 mm and 82 g/25 mm, thereby meeting pre-heating adhesion requirement.

7. In comparative example 1, the primer layer 30 is not formed on the substrate layer 20, a water-based melamine cross-linking agent, a blowing agent, ES-81D, and a dye are added to acrylic emulsion (WB-1) synthesized from known conventional emulsifier, so as to form a water-based liquid-state coating and thereby fabricate the water-based heat-expandable adhesive panel (i.e., the finished product) of the present invention. The pre-heating adhesion of the finished product is 196 g/25 mm, thereby meeting pre-heating adhesion requirement. The finished product is analyzed with the DMA, and its analysis curve yields a storage modulus E' of $0.89 \times 10^6$ dyne/cm$^2$ at 105° C., indicating low post-heating detachability and failure to meet the strict requirements of heating-induced detachment.

8. In comparative example 2, the primer layer 30 is not formed on the substrate layer 20, a water-based melamine cross-linking agent, a blowing agent, ES-81D, and a dye are added to acrylic emulsion (WB-7) synthesized from a reactive emulsifier, so as to form a water-based liquid-state coating and thereby fabricate the water-based heat-expandable adhesive panel (i.e., the finished product) of the present invention. The pre-heating adhesion of the finished product is 103 g/25 mm, thereby meeting pre-heating adhesion requirements. The finished product is analyzed with the DMA, and its analysis curve yields a storage modulus E' of $1.17 \times 10^6$ dyne/cm$^2$ at 105° C., indicating that the post-heating detachability thus developed in comparative example 2 permits partial detachment, and that comparative example 2 excels comparative example 1 in post-heating detachability. Accordingly, comparative example 2 fails to meet the strict requirements of heating-induced detachment.

9. In comparative example 3, a water-based isocyanate cross-linking agent CL and a blowing agent ES-81D are, according to the processing formulae shown in Table 3, added to lipophilic acrylic emulsion (P9) synthesized from solvent EAC and lipophilic heat-expandable resin (WB-12) synthesized from solvent EAC, so as to form a water-based liquid-state coating and thereby fabricate the water-based heat-expandable adhesive panel (i.e., the finished product) of the present invention. The pre-heating adhesion of the finished product equals 64 g/25 mm which is too low to meet pre-heating adhesion requirements. The finished product is analyzed with the DMA, and its analysis curve yields a storage modulus E' of $0.38 \times 10^6$ dyne/cm$^2$ at 105° C., indicating that although the post-heating detachability thus developed permits partial detachment, the requirement for complete detachment remains unfulfilled

What is claimed is:

1. A water-based heat-expandable adhesive panel, comprising a substrate layer functioning as a base layer, a primer layer coated on the substrate layer and a heat-expandable layer coated on the primer layer, characterized in that the primer layer is synthesized by performing emulsion polymerization on an ethylene-based emulsifier having a reactive functional group and acrylic monomers to form a water-based acrylic emulsion, adding a water-based cross-linking agent and a coupling agent to the water-based acrylic emulsion, and then drying the water-based acrylic emulsion; and wherein the heat-expandable layer comprises a blowing agent and a pressure-sensitive adhesive expandable when heated and is synthesized by performing emulsion polymerization on the ethylene-based emulsifier having a reactive functional group and the acrylic monomers to form the water-based acrylic emulsion, followed by blending the water-based acrylic emulsion, the blowing agent, and the water-based cross-linking agent together.

2. The water-based heat-expandable adhesive panel of claim 1, wherein the water-based acrylic emulsion for forming the primer layer is synthesized by emulsion polymerization of major constituents as follows:
    a) 75-92 wt % of alkyl group-containing (meth)acrylic ester;
    b) 2-10 wt % of hydroxyl group-containing (meth)acrylic ester;
    c) 1-5 wt % of carboxyl group-containing (meth)acrylic acid; and
    d) 5-10 wt % of an emulsifier having a reactive functional group.

3. The water-based heat-expandable adhesive panel of claim 1, wherein the water-based acrylic emulsion for forming the heat-expandable layer is synthesized by emulsion polymerization of major constituents as follows:
    a) 83-95 wt % of alkyl group-containing (meth)acrylic ester;
    b) 3-6 wt % of hydroxyl group-containing (meth)acrylic ester;
    c) 0.3-4 wt % of carboxyl group-containing (meth)acrylic acid; and
    d) 1-7 wt % of an emulsifier having a reactive functional group.

4. The water-based heat-expandable adhesive panel of claim 2, wherein the alkyl group-containing (meth)acrylic ester is one, or a mixture of at least one, selected from the group consisting of methyl (meth)acrylate, ethyl (meth)acrylate, propyl (meth)acrylate, butyl (meth)acrylate, isobutyl (meth)acrylate, 2-ethylhexyl (meth)acrylate, octyl (meth)acrylate, isooctyl (meth)acrylate, lauryl (meth)acrylate, octadecyl (meth)acrylate, cyclohexyl (meth)acrylate, methoxyethyl (meth)acrylate, and ethoxymethyl (meth)acrylate.

5. The water-based heat-expandable adhesive panel of claim 3, wherein the alkyl group-containing (meth)acrylic ester is one, or a mixture of at least one, selected from the group consisting of methyl (meth)acrylate, ethyl (meth)acrylate, propyl (meth)acrylate, butyl (meth)acrylate, isobutyl (meth)acrylate, 2-ethylhexyl (meth)acrylate, octyl (meth)acrylate, isooctyl (meth)acrylate, lauryl (meth)acrylate, octadecyl (meth)acrylate, cyclohexyl (meth)acrylate, methoxyethyl (meth)acrylate, and ethoxymethyl (meth)acrylate.

6. The water-based heat-expandable adhesive panel of claim 2, wherein the hydroxyl group-containing (meth) acrylic ester is one selected from the group consisting of 2-hydroxyethyl (meth)acrylate, 4-hydroxybutyl (meth)acrylate, chloro-2-hydroxypropyl acrylate, diethylene glycol mono(meth)acrylate, and allyl alcohol.

7. The water-based heat-expandable adhesive panel of claim 3, wherein the hydroxyl group-containing (meth) acrylic ester is one selected from the group consisting of 2-hydroxyethyl (meth)acrylate, 4-hydroxybutyl (meth)acrylate, chloro-2-hydroxypropyl acrylate, diethylene glycol mono(meth)acrylate, and allyl alcohol.

8. The water-based heat-expandable adhesive panel of claim 2, wherein the carboxyl group-containing (meth) acrylic acid is one selected from the group consisting of acrylic acid, methacrylic acid, itaconic acid, butenoic acid, maleic acid, fumaric acid, and maleic anhydride.

9. The water-based heat-expandable adhesive panel of claim 3, wherein the carboxyl group-containing (meth) acrylic acid is one selected from the group consisting of acrylic acid, methacrylic acid, itaconic acid, butenoic acid, maleic acid, fumaric acid, and maleic anhydride.

10. The water-based heat-expandable adhesive panel of claim 1, wherein the water-based heat-expandable adhesive panel is analyzed with a dynamic mechanical analyzer (DMA), and evaluation of an adhesive elasticity curve of the water-based heat-expandable adhesive panel indicates that a storage modulus E' of $3.0 \times 10^6$ dyne/cm$^2$ or above is required at 25° C., and that a storage modulus E' of $1.0 \times 10^6$ dyne/cm$^2$ or above is required at 105° C.

11. The water-based heat-expandable adhesive panel of claim 1, wherein the blowing agent is of average particle diameter between 5 μm and 50 μm and of heat-expandable temperature between 50° C. and 250° C., wherein the water-based cross-linking agent comprises one selected from the group consisting of a water-based isocyanate compound, a water-based epoxy-based compound, an amine-based compound, a metal-chelating-based compound, and an aziridine-based compound.

12. The water-based heat-expandable adhesive panel of claim 1, wherein a polyester release film layer is affixed to a surface of the heat-expandable layer.

* * * * *